US008625179B2

(12) United States Patent
Sakatani

(10) Patent No.: US 8,625,179 B2
(45) Date of Patent: Jan. 7, 2014

(54) COLOR ADJUSTMENT METHOD AND IMAGE FORMING SYSTEM USING GAMMA CURVE ASSOCIATING DENSITIES OF PATCHES FROM DIFFERENT PRINTERS

(75) Inventor: Kazuomi Sakatani, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 146 days.

(21) Appl. No.: 13/371,973

(22) Filed: Feb. 13, 2012

(65) Prior Publication Data

US 2012/0206746 A1 Aug. 16, 2012

(30) Foreign Application Priority Data

Feb. 15, 2011 (JP) ................. 2011-029453

(51) Int. Cl.
*H04N 1/60* (2006.01)
*H04N 1/00* (2006.01)
(52) U.S. Cl.
CPC ......... *H04N 1/6052* (2013.01); *H04N 1/00015* (2013.01); *H04N 1/00023* (2013.01); *H04N 1/00034* (2013.01)
USPC .......................................... 358/519; 358/504
(58) Field of Classification Search
USPC ............... 358/1.9, 3.24, 3.26, 1.13, 504, 518, 358/519, 520, 530; 382/167; 399/39, 49, 399/72; 347/19, 43
See application file for complete search history.

(56) References Cited

U.S. PATENT DOCUMENTS 8,014,689 B2 * 9/2011 Nishizawa ...................... 399/49
2008/0285990 A1 * 11/2008 Nishizawa ...................... 399/49

FOREIGN PATENT DOCUMENTS

JP 5-153383 6/1993

* cited by examiner

*Primary Examiner* — Scott A Rogers
(74) *Attorney, Agent, or Firm* — Finnegan, Henderson, Farabow, Garrett & Dunner, L.L.P.

(57) ABSTRACT

Disclosed is a color adjustment method for each of image forming apparatuses, including: a gradation pattern creation step of forming a gradation pattern image including patches different in gradation for each of colors in n pieces of coloring materials; a density detection step of detecting densities of the respective patches, and obtaining density information; a gamma curve creation step of associating the density information of the respective patches in a second image forming apparatus with that in the first, and creating a gamma curve correcting a gradation of received image data so as to obtain densities of the respective patches in the first image forming apparatus; and a color adjustment step of extracting respective color components, deciding output values based on the gamma curve corresponding to the second image forming apparatus, creating output image data, and forming an image on a sheet in the second image forming apparatus.

18 Claims, 32 Drawing Sheets

*FIG.8*

|  | IMAGE FORMING APPARATUS (1) | IMAGE FORMING APPARATUS (2) | ... | IMAGE FORMING APPARATUS (n) |
|---|---|---|---|---|
| TARGET MACHINE / SAMPLE MACHINE | TARGET MACHINE | SAMPLE MACHINE | ... | SAMPLE MACHINE |
| DENSITY MEASUREMENT VALUE (GRADATIONS = 255) | 1.67 | 1.70 | ... | 1.64 |

FIG.19

| OUTPUT COLOR | IMAGE DENSITY SIGNAL | INTERMEDIATE SIGNAL |
|---|---|---|
| Pb | RGB | Y |
| R | | Y |
| G | | Y |
| B | | Y |
| C | | R |
| M | | G |
| Y | | B |
| K | | G |

FIG.20A

| INPUT GRADATION VALUE | MEASURED γ VALUE |
|---|---|
| 0 | 245.25 |
| 31 | 215.44 |
| 63 | 182.33 |
| 95 | 156.96 |
| 127 | 132.37 |
| 159 | 114.11 |
| 191 | 90.25 |
| 223 | 69.02 |
| 255 | 48.03 |

FIG.20B

| INPUT GRADATION VALUE | MEASURED γ VALUE |
|---|---|
| 0 | 234.39 |
| 31 | 204.87 |
| 63 | 173.70 |
| 95 | 150.72 |
| 127 | 127.87 |
| 159 | 111.96 |
| 191 | 87.70 |
| 223 | 67.63 |
| 255 | 47.30 |

COLOR ADJUSTMENT METHOD AND IMAGE FORMING SYSTEM USING GAMMA CURVE ASSOCIATING DENSITIES OF PATCHES FROM DIFFERENT PRINTERS

CROSS-REFERENCE TO RELATED APPLICATION

The present U.S. patent application claims a priority under the Paris Convention of Japanese patent application No. 2011-029453 filed on Feb. 15, 2011, which shall be a basis of correction of an incorrect translation, and is incorporated by reference herein.

BACKGROUND OF THE INVENTION

1. Field of the Invention

The present invention relates to a color adjustment method and an image forming system.

2. Description of the Related Art

Heretofore, in the field of the offset printing, a technology has been known, in which solid patches of seven colors RGB and CMYK are printed as control strips on a cut margin, the colors are measured by a densitometer, a colorimeter and the like, and ink amounts of the respective colors are adjusted.

Meanwhile, in an image forming apparatus that performs image formation by using an electrophotographic process, in place of operations of outputting solid patches of four colors CMYK, measuring the colors, and adjusting ink amounts thereof, there is generally performed change of process conditions such as a development potential, which includes adjustment of a charge amount for an image carrier, and adjustment of an amount of light emitting energy to the image carrier. In such a way, adjustment at highest densities is enabled.

In general, when the change of the process conditions is performed as mentioned above, gradation characteristics at half tones are also changed. Accordingly, after the process conditions are changed, gray-scale images of the respective colors CMYK are outputted and are measured, whereby γ correction is performed.

However, in the color adjustment in the image forming apparatus according to the conventional electrophotographic process mode, only primary colors composed of single colors among CMYK are taken as correction targets, and indirect correction is merely performed for secondary or more colors composed of two or more colors among CMYK. In actual, owing to a state change in an imaging process such as transfer and fixing onto a sheet, ideal states are not always achieved in the secondary colors even if the primary colors are adjusted to ideal states. Accordingly, in the color adjustment as described above, stabilization of an image cannot be achieved.

Meanwhile, a chart in which patch images of a thousand or several thousand colors are formed is outputted, the respective patches are individually measured by an external instrument such as the colorimeter, and a color profile is created based on results of the measurement, whereby the color adjustment of the primary color and the secondary or more colors is possible. However, a time and a work load for such color adjustment work are required for a user to an extremely large extent.

While such a technology as described above has been known, Japanese Patent Laid-Open Publication No. H05-153383 discloses a color correction apparatus, which separates density signals of CMY into black components, secondary color components and primary color components, and multiplies each of these separated components by a fixed ratio, thereby performs correction thereof independently, and thereafter, adds and outputs these.

Incidentally, for example, in the field of the light printing, and the like, large-volume printing is performed by using a plurality of image forming apparatuses. Hence, it is necessary that the color adjustment be performed for each of the image forming apparatuses for use so that similar output results can be obtained in all the image forming apparatuses. Then, in the plurality of image forming apparatuses as described above, even if a type thereof is the same, a machine difference is inherent in characteristics of the imaging process, such as transfer properties to a sheet. Accordingly, even if similar color adjustment is performed among the plurality of image forming apparatuses, the same output result is not always obtained.

However, in the technology described in Japanese Patent Laid-Open Publication No. H05-153383, the color adjustment is implemented only for the target apparatus concerned, and how to perform the adjustment among the apparatuses is not taken into consideration at all. Accordingly, it is necessary to perform the color adjustment individually for each of the plurality of image forming apparatuses while comparing the results of the color adjustment among the apparatuses with one another, and this is extremely cumbersome.

SUMMARY OF THE INVENTION

The present invention has been made in consideration of the above-described circumstances. It is an object of the present invention to provide a color adjustment method and an image forming system, each of which can simply implement such color adjustment that can obtain a similar output result for a plurality of image forming apparatuses.

In order to realize the foregoing object, a color adjustment method for performing color adjustment for each of a plurality of image forming apparatuses, the color adjustment method reflecting an aspect of the present invention, includes:

a gradation pattern creation step of, in each of the plural image forming apparatuses, forming, on a sheet, a gradation pattern image including patches different in gradation for each of colors in n (n is a positive integer) pieces of coloring materials, the colors ranging from a primary color composed of one color to an n-ary color composed of n colors in the n pieces of coloring materials;

a density detection step of detecting densities of the respective patches included in the gradation pattern image formed on the sheet, and obtaining density information for each of the image forming apparatuses;

a gamma curve creation step of, among the density information of the respective patches for each of the image forming apparatuses, the density information being obtained in the density detection step, associating the density information of the respective patches in a second image forming apparatus other than a first image forming apparatus serving as a reference with the density information of the respective patches in the first image forming apparatus, and then creating, for each of the image forming apparatuses, a gamma curve corresponding to each of the respective colors ranging from the primary color to the n-ary color, the gamma curve serving for correcting a gradation of received image data, so as to obtain densities indicated by the density information of the respective patches in the first image forming apparatus; and a color adjustment step of extracting respective color components ranging from the primary color to the n-ary color from the image data inputted to the second image forming apparatus, deciding output values in each of the respective color components based on the gamma curve corresponding to the second image forming apparatus that has received the image data, creating output image data by synthesizing the decided output values of the primary color to the n-ary color with one another, and forming an image on the sheet in the second image forming apparatus based on the created output image data.

Moreover, the color adjustment method further includes:

a screen gradation correction curve creation step of outputting, by the first image forming apparatus, a screen patch of plural gradations by the primary color, and creating in advance a screen gradation correction curve based on screen gradation characteristics obtained by individually capturing densities of the screen patch, and, in the gradation pattern creation step, the gradation pattern image is formed on the sheet by applying the screen gradation correction curve for each of the plural image forming apparatuses.

Moreover, the color adjustment method further includes:

a maximum density measurement step of measuring each density at a maximum gradation in the primary color in the plural image forming apparatuses; and an imaging process setting step of selecting a specific image forming apparatus among the plural image forming apparatuses, and changing setting of an imaging process in each of the plural image forming apparatuses so that the densities at the maximum gradation in the primary color in the image forming apparatuses other than the selected specific image forming apparatus are to be the density at the maximum gradation in the primary color in the selected specific image forming apparatus, and the maximum density measurement step and the imaging process setting step are implemented in advance before implementing the gradation pattern creation step.

Moreover, each of the plural image forming apparatuses includes: an image carrier that carries a toner image; a light source for exposing the image carrier and forming an electrostatic latent image; and a developing unit that develops the formed electrostatic latent image by a developer, and in the imaging process setting step, the setting of the imaging process is changed by changing an output amount of the light source.

Moreover, each of the plural image forming apparatuses includes: an image carrier that carries a toner image; a charger that charges the image carrier; a light source for exposing the charged image carrier and forming an electrostatic latent image; and a developing unit that develops the formed electrostatic latent image by a developer, and in the imaging process setting step, the setting of the imaging process is changed by changing a charging voltage for the image carrier in the charger.

Moreover, in the density detection step, light is irradiated onto the respective patches, and the density information is obtained based on an image density signal including respective RGB signal components obtained by receiving light reflected by the respective patches, and in addition, with regard to patches of secondary or more colors, a luminance signal as a component representing brightness is extracted from the image density signal, and the density information is obtained based on the extracted luminance signal.

Moreover, the n pieces of the coloring materials are three-color toner materials of cyan, magenta and yellow.

BRIEF DESCRIPTION OF THE DRAWINGS

The present invention will be more fully understood by the following detailed description and the accompanying drawings. However, these are not intended to limit the present invention, wherein:

FIG. 8 is a table explaining measurement results of solid images;

FIG. 19 is a table explaining intermediate signals;

FIG. 20A is a table explaining gradation characteristic information;

FIG. 20B is a table explaining gradation characteristic information;

PREFERRED EMBODIMENTS OF THE PRESENT INVENTION

Figure 1:
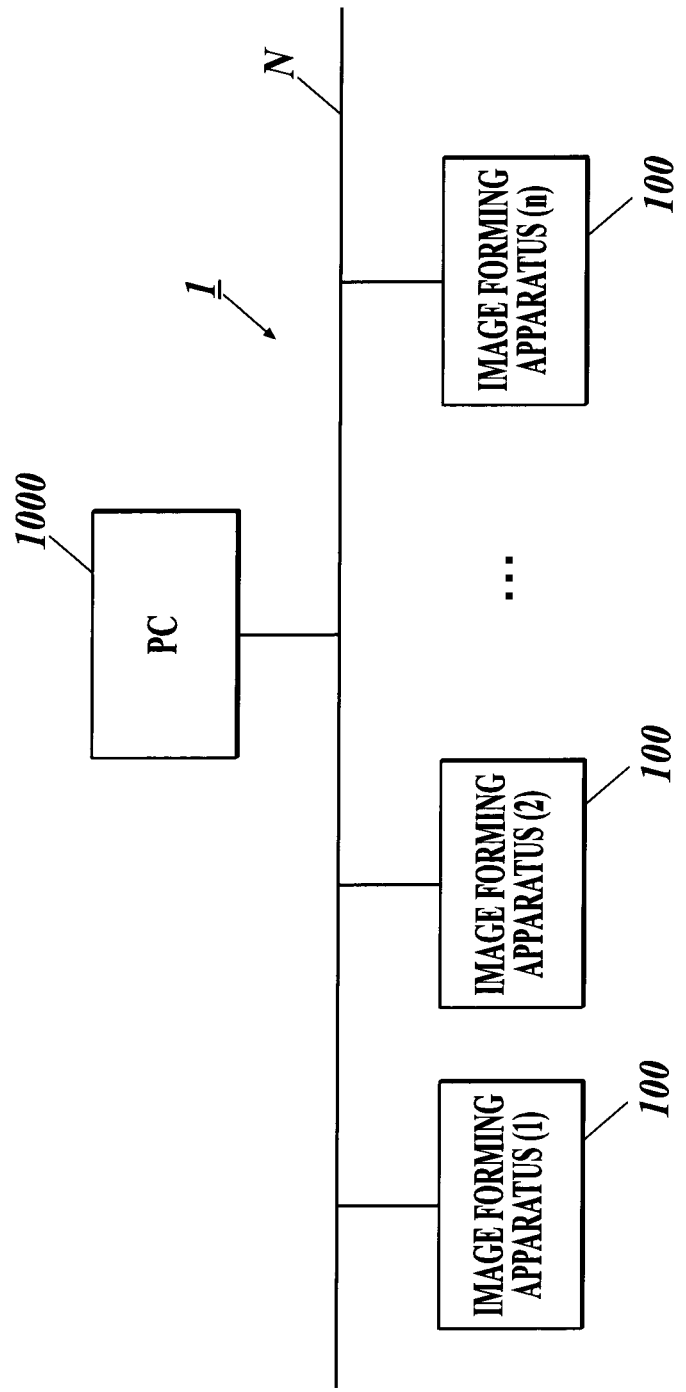
FIG. 1 is a schematic configuration diagram of an image forming system according to an embodiment of the present invention.

A description is made below of an image forming system as a system for performing color adjustment according to embodiments of the present invention with reference to the drawings. However, the scope of the invention is not limited to the illustrated examples. Note that, in the following description, the same reference numerals are assigned to those having similar functions and configurations, and a description thereof is omitted.

First Embodiment

FIG. 1 shows a schematic configuration diagram of an image forming system 1 according to a first embodiment.

As shown in FIG. 1, the image forming system 1 according to the first embodiment is composed in such a manner that n pieces (n is plural) of image forming apparatuses 100, personal computer (PC) 1000 and the like are connected to a network N. The plurality of image forming apparatuses 100 are individually allocated to the number (1) to the number (n). The PC 1000 is an information processing apparatus, which is composed of a general PC, and performs a printing instruction for the respective image forming apparatuses 100. In the PC 1000, there are installed a printer driver program for performing the printing instruction and designation of a printing method, and the like.

Figure 2:
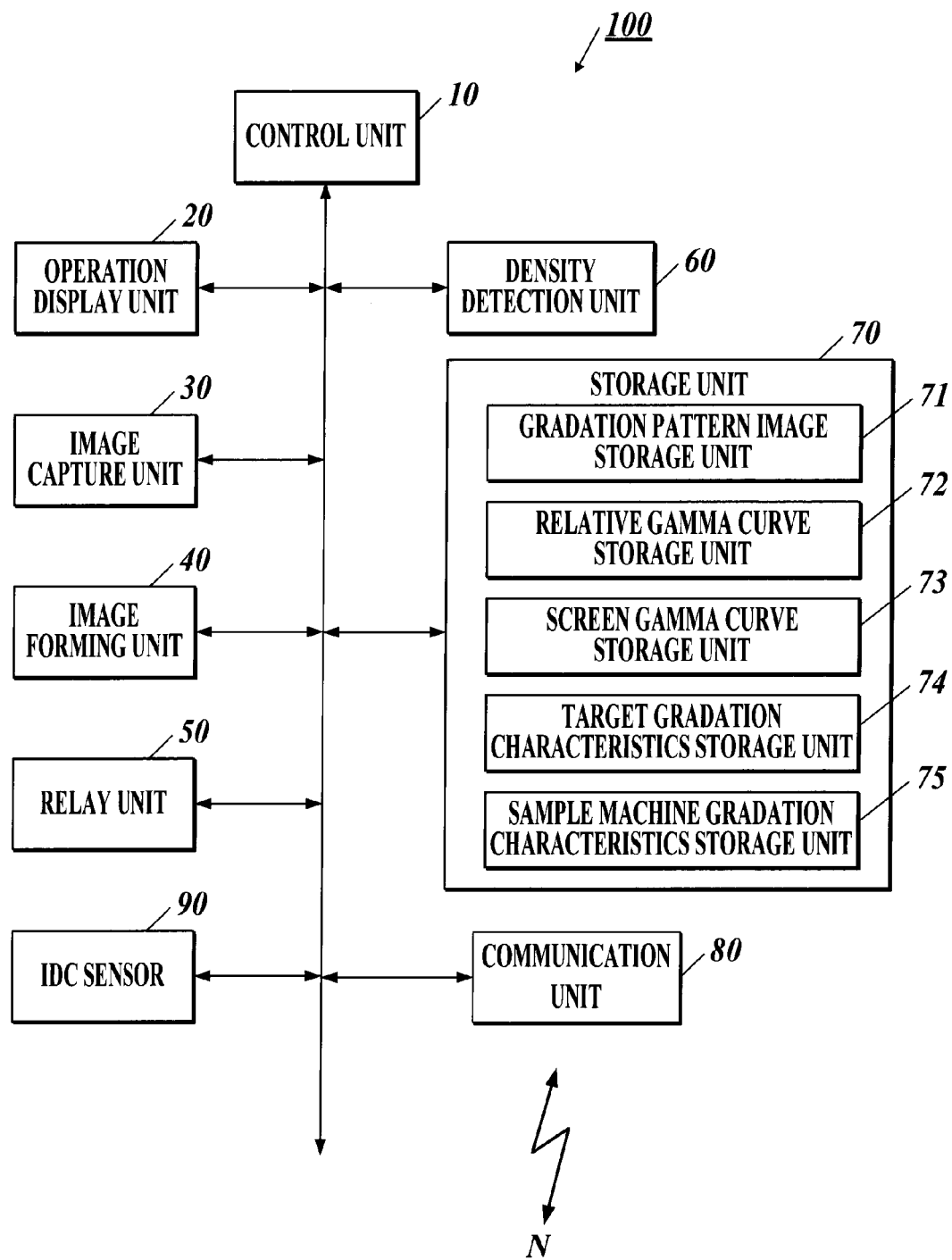
FIG. 2 is a block diagram showing a functional configuration of an image forming apparatus.

Next, a description is made of a functional configuration of the image forming apparatus 100 with reference to FIG. 2. Note that all of such plural image forming apparatuses 100 which compose the image forming system 1 have a similar configuration, and accordingly, in the following, a description is mainly made of the image forming apparatus 100 allocated to the number (1). In the following, it is assumed that a description is made of the image forming apparatus 100 allocated to the number (1) except for those described explicitly. The image forming apparatus 100 according to this embodiment is a multi-function peripheral provided with a copy function, an image capture function, and a printer function, and is a color image forming apparatus of an electrophotographic mode.

As shown in FIG. 2, the image forming apparatus 100 is composed of: a control unit 10; an operation display unit 20; an image capture unit 30; an image forming unit 40; a relay unit 50; a density detection unit 60; a storage unit 70; a communication unit 80; an image density control (IDC) sensor 90; and the like. The respective unites are connected to one another by a bus.

The control unit 10 is composed of: a central processing unit (CPU), a read only memory (ROM); a random access memory (RAM); and the like. In response to an operation signal inputted from the operation display unit 20 or to an instruction signal received by the communication unit 80, the CPU reads out a system program and a variety of processing programs, which are stored in the ROM, and then expands the programs thus read out to the RAM. Then, in accordance with the expanded programs, the CPU controls operations of the respective units of the image forming apparatus 100 in a centralized manner.

The operation display unit 20 includes a touch panel display having a liquid crystal display (LCD), and in accordance with an instruction of a display signal inputted from the control unit 10, performs, on a display screen, display of states of various operation buttons and the apparatus, and display of operation situations and the like of the respective functions. The touch panel display is composed in such a manner that the display screen of the LCD is covered with a pressure-sensitive (resistive film pressure-type) touch panel composed by arranging a transparent electrode in a grid shape, and detects, by a voltage value, a position of a coordinate pressed by the finger, a touch pen and the like. The operation display unit 20 outputs a detected position signal as an operation signal to the control unit 10. Moreover, the operation display unit 20 includes a variety of operation buttons such as number buttons and a start button, and outputs an operation signal, which is created by an operation for the button, to the control unit 10.

The image capture unit 30 is composed by including a scanner under a contact glass on which an original is mounted, and captures an image of the original. The scanner is composed of a light source, a charge coupled device (CCD) image sensor, an A/D converter and the like. The scanner forms an image from reflected light obtained by illuminating and scanning the original from the light source, then performs photoelectric conversion for the formed image, thereby captures the image of the original as RGB signals, performs A/D conversion for the captured image, and creates image data.

The image forming unit 40 forms and outputs an image onto a sheet based on image data of yellow (Y), magenta (M), cyan (C) and black (K) in accordance with an electrophotographic mode.

Figure 3:
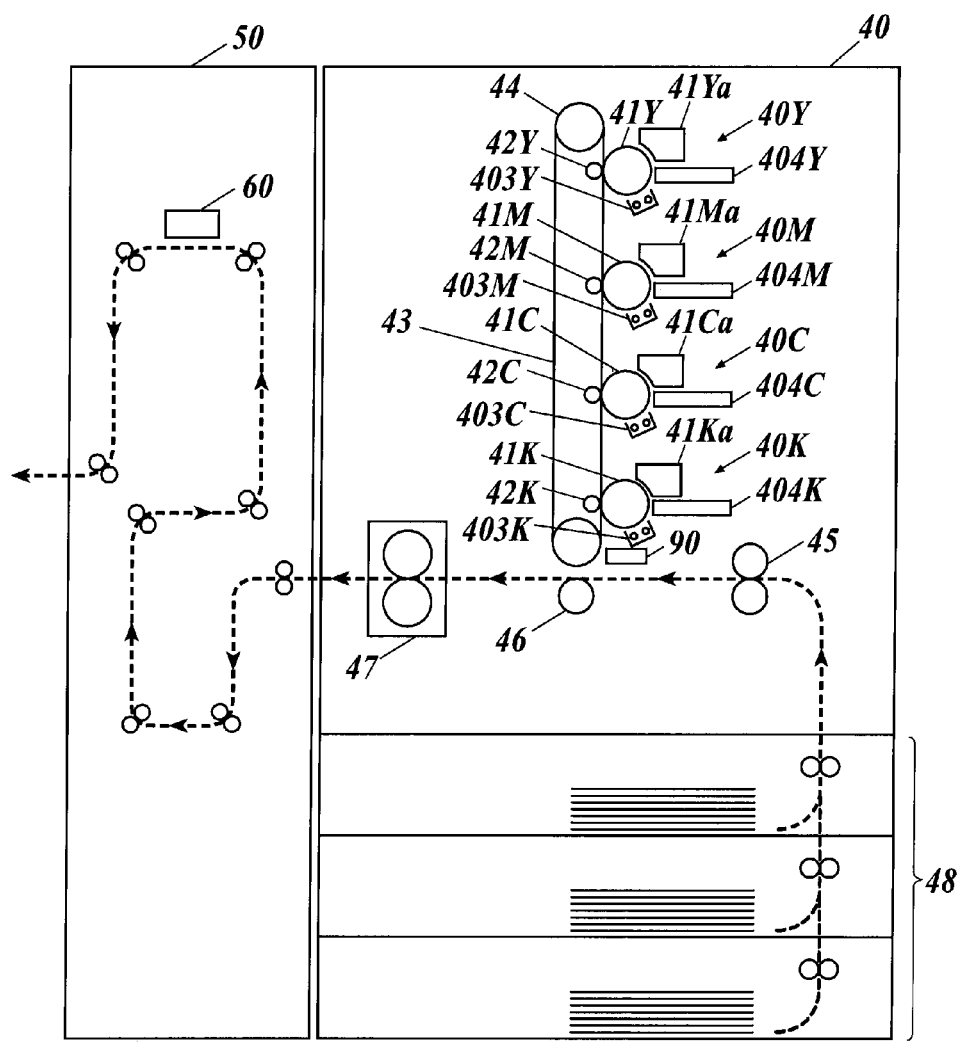
FIG. 3 is a schematic cross-sectional view of an image forming unit and a relay unit.

As shown in FIG. 3, the image forming unit 40 is composed by including: image forming units 40Y, 40M, 40C and 40K of the respective colors Y, M, C and K; an intermediate transfer belt 43; rollers 44; resist rollers 45; a secondary transfer roller 46; a fixing unit 47; a sheet feed unit 48; and the like. The image forming units 40Y, 40M, 40C and 40K respectively include: photosensitive drums 41Y, 41M, 41C and 41K; developing units 41Ya, 41Ma, 41Ca and 41Ka; and primary transfer rollers 42Y, 42M, 42C and 42K.

Figure 4:
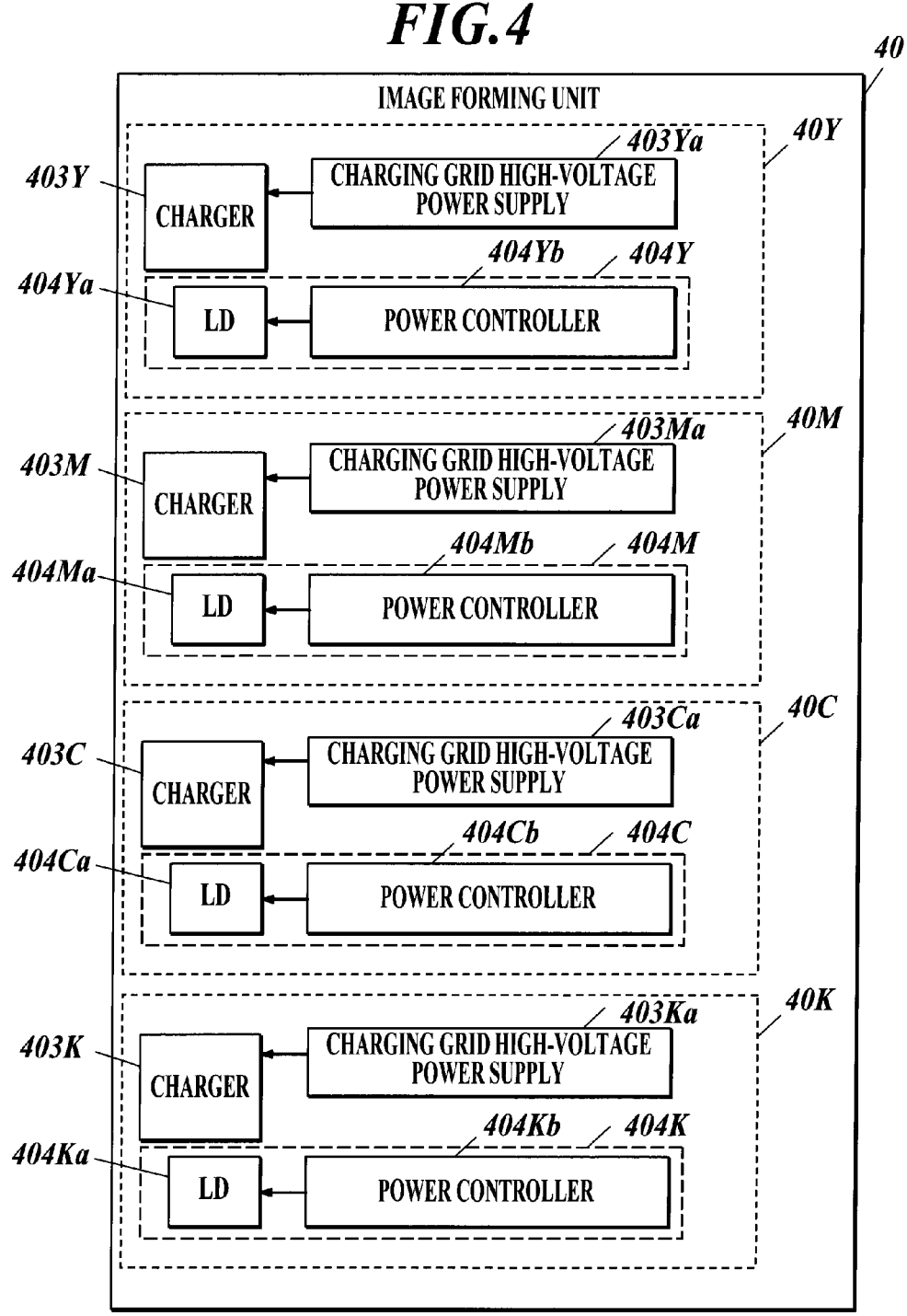
FIG. 4 is a block diagram showing a functional configuration of the image forming unit.

Moreover, as shown in FIG. 4, the image forming units 40Y, 40M, 40C and 40K include charging grid high-voltage power supplies 403Ya, 403Ma, 403Ca and 403Ka, respectively, and these charging grid high-voltage power supplies 403Ya, 403Ma, 403Ca and 403Ka are connected to chargers 403Y, 403M, 403C and 403K, respectively.

The charging grid high-voltage power supplies 403Ya, 403Ma, 403Ca and 403Ka are power supplies which supply bias voltages for allowing the chargers 403Y, 403M, 403C and 403K to charge the photosensitive drums 41Y, 41M, 41C and 41K. The charging grid high-voltage power supplies 403Ya, 403Ma, 403Ca and 403Ka output voltage values conforming to the instruction from the control unit 10.

Moreover, the image forming units 40Y, 40M, 40C and 40K include laser units 404Y, 404M, 404C and 404K, respectively, the respective layer units 404Y, 404M, 404C and 404K respectively include: laser diodes (LDs) 404Ya, 404Ma, 404Ca and 404Ka as light sources; and power controllers 404Yb, 404Mb, 404Cb and 404Kb. By the power controllers 404Yb, 404Mb, 404Cb and 404Kb, energy adjustment of the LDs 404Ya, 404Ma, 404Ca and 404Ka is performed.

Note that other light sources may be used in place of the laser diodes, and for example, light-emitting diodes (LEDs) can be applied.

Here, a description is made of the image formation in the image forming unit 40.

The photosensitive drum 41Y rotates, a surface thereof is charged by the charger 403Y, and by exposure of the LD 404Ya, a latent image of an image with Y data is formed on such a charged portion. Then, a yellow toner image is formed on a portion of the latent image by the developing unit 41Ya. The toner image concerned is transferred to the intermediate transfer belt 43 by pressure contact of the primary transfer roller 42Y. The toner image becomes a yellow image corresponding to image data of an output target. Toner that is not subjected to such transfer is removed by a cleaner (not shown).

Magenta, cyan and black toner images are also formed and transferred individually in a similar way.

The intermediate transfer belt 43 rotates by rotation of the rollers 44 and the primary transfer rollers 42Y, 42M, 42C and 42K, and the YMCK toner images are sequentially superimposed and transferred onto the intermediate transfer belt 43. The sheet feed unit 48 includes a plurality of sheet feed trays, and supplies sheets, which are stored in the sheet feed trays, to the image forming unit 40. The sheets supplied from the respective sheet feed trays of the sheet feed unit 48 are conveyed to the secondary transfer roller 46 by rotation of the resist rollers 45.

Following the rotation of the resist rollers 45 and the secondary transfer roller 46, each of the sheets passes through a press contact portion, whereby the YMCK toner images on the intermediate transfer belt 43 are transferred to the sheet. The sheet to which the YMCK toner images are transferred passes through the fixing unit 47. By pressurization and heating of the fixing unit 47, the YMCK toner images are fixed onto the sheet, and a color image is formed. The sheet on which the image is formed is delivered to the relay unit 50.

Moreover, in the case of performing double-sided printing, the sheet, on one surface of which the image is formed, is inverted, and is then conveyed to the secondary transfer roller 46 by the resist rollers 45 so that another image can be formed on a surface of the sheet, on which the image formation is not performed.

The relay unit 50 has a function to receive the sheet delivered from the image forming unit 40, and to send out the sheet for subsequent processing. In the relay unit 50, the density detection unit 60 is provided in a route thereof. Moreover, the relay unit 50 may include a finisher function to perform respective pieces of processing such as punching processing, folding processing and cutting processing.

The density detection unit 60 outputs voltage values as image density signals to the control unit 10, the voltage values corresponding to densities of the maximum gradation patches of a corrected image for imaging process adjustment and the respective patches of the gradation pattern image on the sheet having subjected to the fixation, on which the image is formed by the image forming unit 40.

The control unit 10 detects the densities of the respective patches based on the voltage values outputted from the density detection unit 60.

Figure 5A:
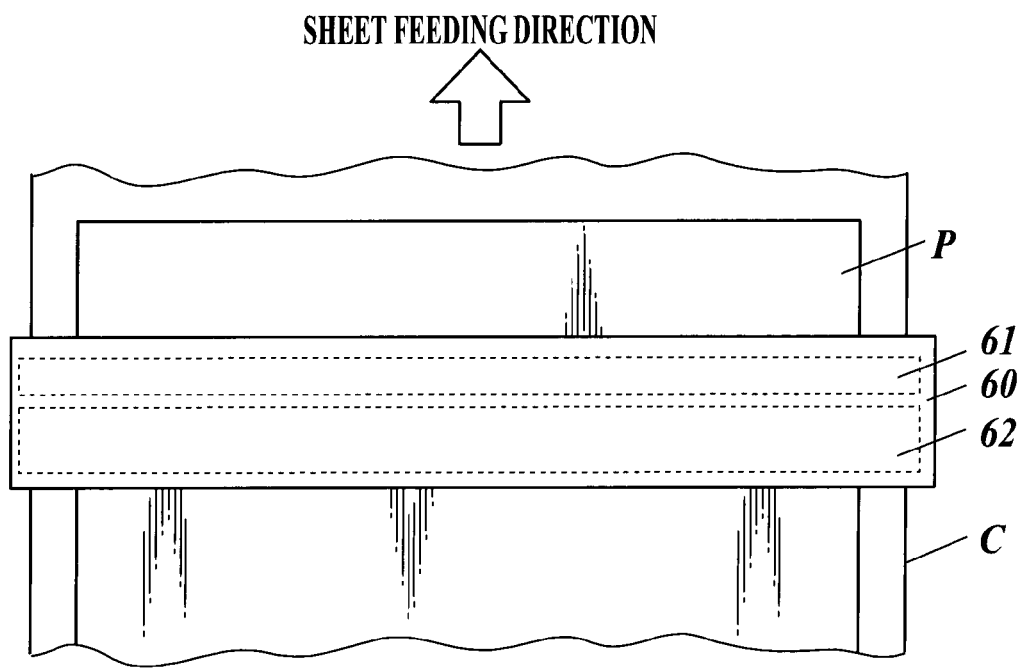
FIG. 5A is an enlarged plan view showing a schematic configuration of a density detection unit.
Figure 5B:
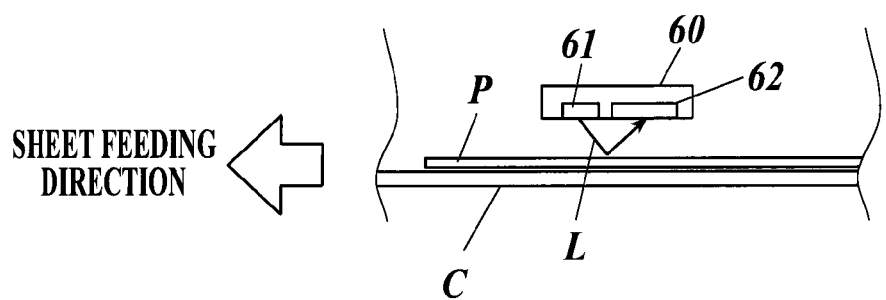
FIG. 5B is a side view showing the schematic configuration of the density detection unit.

FIGS. 5A and 5B show a schematic configuration of the density detection unit 60. FIG. 5A is an enlarged plan view of the density detection unit 60 provided on a conveying passage C, and FIG. 5B is a schematic side view thereof.

As shown in FIGS. 5A and 5B, the density detection unit 60 is composed by including a light source 61 and a CCD 62. For the light source 61, for example, an LED, a cold cathode fluorescent lamp (CCFL) and the like can be applied. Light L outputted from the light source 61 is reflected by the maximum gradation patches of the corrected image for the imaging process adjustment and the respective patches of the gradation pattern image, which are formed on such a sheet P, and then the light L is inputted to the CCD 62. That is to say, the CCD 62 performs scanning by receiving the light L reflected by the maximum gradation patches of the corrected image for the imaging process adjustment and the respective patches of the gradation pattern image.

The CCD 62 is composed to be longer than a sheet width of the sheet P, which is conveyed on the conveying passage C, so as to be able to capture at a time the entire image in the main scanning direction, which is formed on the sheet P.

The light L inputted to the CCD 62 is subjected to the photoelectric conversion, and based on this, the density detection unit 60 specifies a reflectivity as a ratio of a light receiving quantity with respect to a light quantity outputted by the light source 61. Then, the density detection unit 60 outputs a voltage value, which corresponds to this reflectivity, as an image density signal (reflectivity information) to the control unit 10. This image density signal is a signal capable of specifying the gradation of each of the colors RGB. Note that the image density signal may be created from the light receiving quantity obtained by the photoelectric conversion. Moreover, in the density detection unit 60, information indicating the light receiving quantity obtained by the photoelectric conversion may be outputted to the control unit 10, and the reflectivity may be obtained in the control unit 10.

As will be described later, as a result that the scanning for the corrected image for the imaging process adjustment and the gradation pattern image is performed, the control unit 10 performs the adjustment of the imaging process and creation of a relative gamma curve based on the image density signal outputted from the density detection unit 60.

Note that, in this embodiment, in place of the CCD 62, other light receiving elements may be used, which can receive the light reflected by the corrected image for the imaging process adjustment and the gradation pattern image and can perform the photoelectric conversion for the received light. In this case, a configuration in which the light receiving elements are arrayed in a line in the main scanning direction may be adopted, or alternatively, a configuration in which one or plurality of the light receiving elements are moved in the main scanning direction to sequentially scan the image may be adopted. Moreover, in this embodiment, the scanning is performed by the CCD 62 at a position spaced apart from the sheet; however, for example, a capture device of a close contact optical system, such as a contact image sensor (CIS), may be applied.

Moreover, a reference plate capturable by the CCD 62 may be provided, and shading correction may be performed.

The storage unit 70 is composed of a hard disk, a flash memory and the like, and stores a variety of data. The storage unit 70 includes a gradation pattern image storage unit 71; a relative gamma curve storage unit 72; a screen gamma curve storage unit 73; a target gradation characteristic storage unit 74; a sample machine gradation characteristic storage unit 75; and the like.

The gradation pattern image storage unit 71 stores Y/M/C/K/R/G/B/Pb data for forming the gradation pattern image including the plurality of patches with different densities. Here, R (red) is red color as a secondary color created by mixing two magenta and yellow coloring materials with each other. G (green) is green color as a secondary color created by mixing two cyan and yellow coloring materials with each other. B (blue) is blue color as a secondary color created by mixing two cyan and magenta coloring materials with each other. Pb (process black) is black color as a tertiary color created by mixing three cyan, magenta and yellow coloring materials with one another. Note that a specific configuration of the gradation pattern image will be described later.

The relative gamma curve storage unit 72 stores data of a gamma curve, which is used in the event of correcting the gradation characteristics of the image forming unit 40, for each color of Y, M, C, K, R, G, B and Pb. As will be described later, in the relative gamma curve, an input value and an output value are associated with each other so that gradation characteristics serving as a reference can be obtained with respect to the input value. The relative gamma curve may be stored in a form of an arithmetic expression for the input value, or may be stored in a form of a look up table (LUT) in which the input value and the output value are associated with each other. A creation method of the relative gamma curve will be described later.

For each color of Y, M, C and K, the screen gamma curve storage unit 73 stores data of a gamma curve for performing correction so that the density of the image can linearly change in response to change of the gradation. In this embodiment, the screen gamma curve is created in a specific image forming apparatus among the plurality of image forming apparatuses, and in the other image forming apparatuses, this screen gamma curve is imported and used, whereby a common screen gamma curve is used in all the image forming apparatuses. Note that the screen gamma curve may be stored in a form of an arithmetic expression for the input value, or may be stored in a form of LUT in which the input value and the output value are associated with each other. A creation method of the screen gamma curve will be described later.

The target gradation characteristic storage unit 74 store, as target gradation characteristics, gradation characteristics for each color of Y, M, C, K, R, G, B and Pb, which serve as references in the event of creating the relative gamma curve. In this embodiment, among the plurality of image forming apparatuses 100 which compose the image forming system 1, the image forming apparatus 100 allocated with the number (1) is set as an apparatus (target machine) serving as a reference, and gradation characteristics obtained from this target machine are defined as target gradation characteristics, are exported from the target machine to the other image forming apparatuses 100, and are used therein. An obtaining method of the target gradation characteristics will be described later.

The sample machine gradation characteristic storage unit 75 stores the gradation characteristics for each color of Y, M, C, K, R, G, B and Pb, which are obtained in the machine itself, as sample machine gradation characteristics. The sample machine gradation characteristics are associated with the above-mentioned target gradation characteristics in the event of creating the relative gamma curve. The sample machine gradation characteristics are stored in the sample machine gradation characteristic storage unit 75 in at least the number (2) to number (n) image forming apparatuses 100 as sample machines. An obtaining method of the sample machine gradation characteristics will be described later.

The communication unit 80 is composed of a local area network (LAN) adapter, a router, terminal adapter (TA), and the like, performs control for communication with the respective apparatuses connected to the network N.

As shown in FIG. 3, the IDC sensor 90 includes: a light emitting body such as an LED, which is arranged in the vicinity of the intermediate transfer belt 43, and irradiates inspection light onto the toner image transferred to the intermediate transfer belt 43; and light receiving portion such as a phototransistor, which receives reflected light as a result that the inspection light is reflected on the toner image. The light receiving unit outputs, as an output value, a reflectivity and the like on the toner image. The control unit 10 receives the output value from the IDC sensor, and specifies the density of the toner image.

Figure 6:
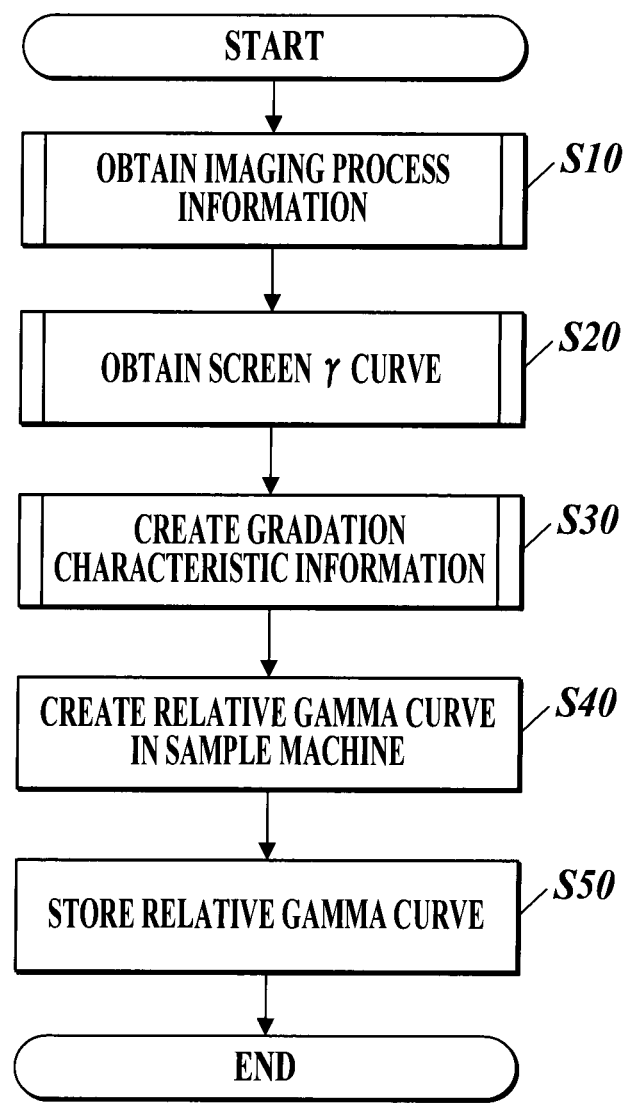
FIG. 6 is a schematic flowchart explaining a procedure for obtaining various pieces of information for implementing color adjustment in a first embodiment.

Next, while referring to FIG. 6, a description is made of a procedure for obtaining the various pieces of information for implementing the color adjustment in this embodiment.

In this embodiment, the various pieces of information are obtained every time when the execution and operation of the user by the operation display unit 20 are performed and the image is formed on a predetermined number of sheets. Note that a time of obtaining the various pieces of information can be arbitrarily set.

Figure 7:
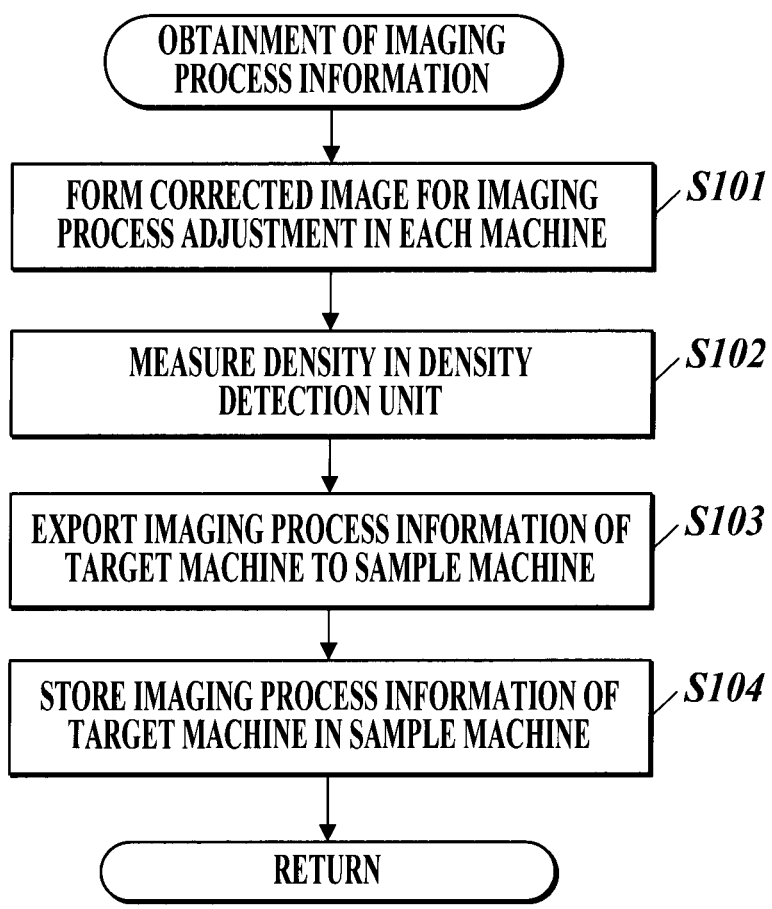
FIG. 7 is a flowchart explaining a procedure for obtaining imaging process information in the first embodiment.

First, in each of the plural image forming apparatuses 100, imaging process information, in which characteristics of an imaging process are indicated, is obtained (Step S10). Specifically, each of the control units 10 of the plural image forming apparatuses 100 obtains the characteristics of the imaging process, and the control unit 10 of the number (1) image forming apparatus 100 that is the target machine serving as the reference exports the obtained imaging process information, which indicates the characteristics of the imaging process, to the number (2) to (n) image forming apparatuses 100 which are the sample machines. Each of the sample machines stores and holds the exported imaging process information of the target machine. Here, while referring to FIG. 7, a description is made of a procedure for obtaining the imaging process information.

First, in each of the number (1) to (n) image forming apparatuses 100, the corrected image for the imaging process adjustment is formed (Step S101). More specifically, in the image forming unit 40, each of the control units 10 of the number (1) to number (n) image forming apparatuses 100 forms, on the sheet, the maximum gradation patches having the maximum gradations (255) of the respective colors Y, M, C and K. The maximum gradation patches are solid images with a predetermined size.

Next, each of the control units 10 of the number (1) to number (n) image forming apparatuses 100 captures, by the density detection unit 60, the densities of the maximum gradation patches of the respective colors, which are formed on the sheet. As a result, for example, measurement results as shown in FIG. 8 are obtained as characteristics of the imaging process in each of the image forming apparatuses 100. Note that the measurement results shown in FIG. 8 show densities in the color K, and similar measurement results are also obtained for the other colors.

Note that the densities of the maximum gradation patches formed on the sheet may be obtained visually or a scanner, a colorimeter and the like, and results thus obtained may be inputted to each of the image forming apparatuses 100.

Next, the control unit 10 of the number (1) image forming apparatus 100 as the target machine exports density information, which indicates the density measurement values of the respective colors, as the imaging process information from the target machine to the number (2) to number (n) image forming apparatuses 100 (Step S103).

Then, each of the control units 10 of the number (2) to number (n) image forming apparatuses 100 as the sample machines stores the exported density information of the target machine in the storage unit 70 (Step S104). Moreover, in a similar way, each of the control units 10 of the sample machines also stores and holds the density information of the machine itself, which is obtained as mentioned above, in the storage unit 70.

Note that, in this embodiment, the characteristics of the imaging process of the number (1) image forming apparatus 100 as the target machine are taken as a reference; however, the characteristics of the imaging process of any of the image forming apparatuses other than the target machine, that is, of the (2) to number (n) image forming apparatuses 100 may be taken as a reference, and the characteristics may be imported and held in other image forming apparatuses.

Figure 9:
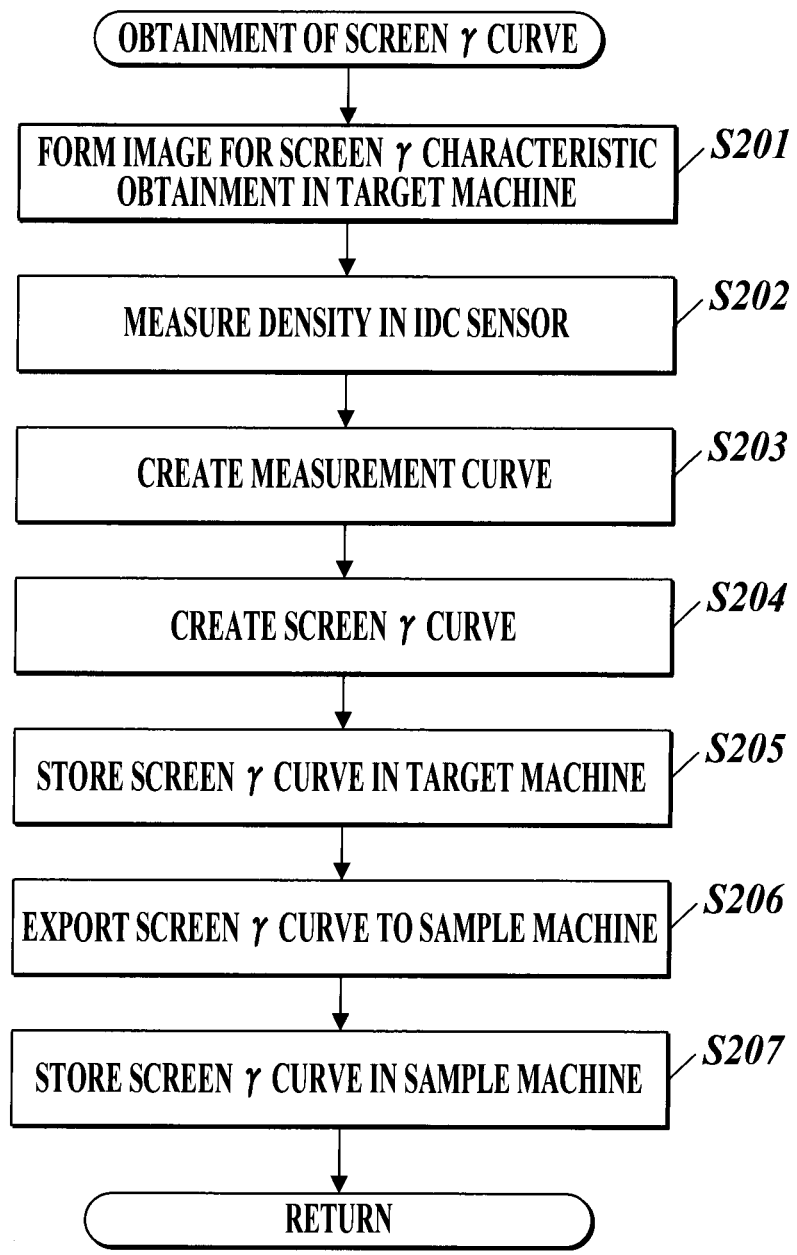
FIG. 9 is a flowchart explaining a procedure for obtaining a screen gamma curve in the first embodiment.

When the imaging process information is obtained in such a manner as described above, then as shown in FIG. 6, the screen gamma curve is obtained in each of the plural image forming apparatuses 100 (Step S20). That is to say, the control unit 10 of the number (1) image forming apparatus 100 forms a plurality of screen images, which are different in gradation from one another, in the image forming unit 40, and measures densities of the screen images individually for each color. From measurement results of the above, the control unit 10 of the target machine creates the screen gamma curve for performing the correction so that the density of the image can linearly change in response to the change of the gradation. The control unit 10 of the target machine exports the created screen gamma curve to each of the number (2) to number (n) image forming apparatuses 100 as the sample machines. Each of the image forming apparatuses 100 stores and holds the screen gamma curve corresponding to the number (1) image forming apparatus 100. Here, while referring to FIG. 9, a description is made in detail of a procedure for obtaining the screen gamma curve.

Figure 10:
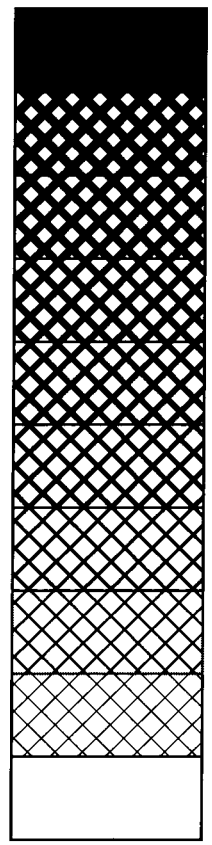
FIG. 10 is a view showing an example of an image for obtaining screen gamma characteristics.

First, in the number (1) image forming apparatus 100 as the target machine, an image for obtaining screen gamma characteristics is formed (Step S201). Specifically, for each of the colors Y, M, C and K, the image forming unit 40 of the number (1) image forming apparatus 100 creates such a screen gamma characteristic obtaining image as shown in FIG. 10, and forms the created screen gamma characteristic obtaining image on the intermediate transfer belt 43. The screen gamma characteristic obtaining image is a step wedge image composed of a plurality of gradations, that is, patch-like density steps in which the density changes step by step.

Next, the control unit 10 of the target machine captures, in the IDC sensor 90, the screen gamma characteristic obtaining image formed on the intermediate transfer belt 43, and measures the density of each screen image (Step S202).

Figure 11:
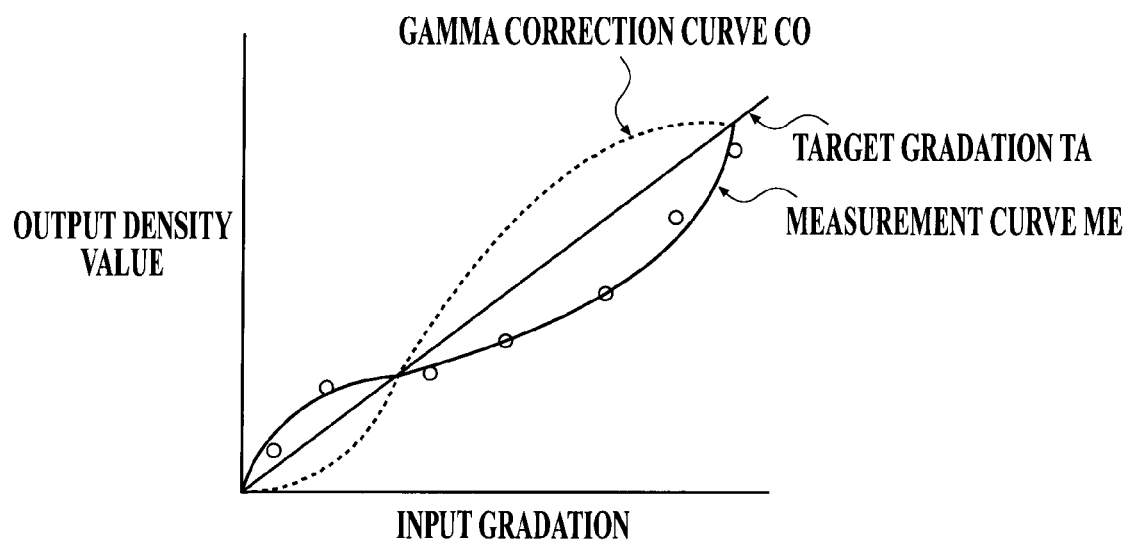
FIG. 11 is a view showing a gamma correction curve calculated from a measured curve.

Next, a measurement result of the density of each screen image, which is measured as mentioned above, is created for each color (Step S203). Specifically, the control unit 10 of the target machine receives an output value outputted from the IDC sensor 90, performs logarithmic transformation for this output value, and obtains a density value. Then, as shown in FIG. 11, the control unit 10 plots thus outputted density values with respect to the inputted gradations of the screen gamma characteristic obtaining image. In FIG. 11, plotted points are indicated by circle marks. Then, the control unit 10 calculates a measurement curve ME based on the plotted points.

Next, based on the measurement curve ME obtained as mentioned above, the screen gamma curve for correcting the output density value is created (Step S204). Specifically, as shown in FIG. 11, the control unit 10 of the target machine creates a gamma correction curve CO, which has inverse characteristics of the measurement curve ME with respect to a straight line indicating a target gradation TA predetermined so that the density value can change linearly in response to the change of the gradation. Based on this gamma correction curve CO, the control unit 10 replaces the output density value by a gradation value, and creates, for each color of Y, M, C and K, the screen gamma curve for obtaining an output gradation with respect to an input gradation. This screen gamma curve is composed, for example, of a one-dimensional LUT.

The control unit 10 of the target machine stores the screen gamma curve of each color, which is created as mentioned above, in the screen gamma curve storage unit 73 of the storage unit 70 (Step S205).

Meanwhile, the control unit 10 of the target machine exports the same screen gamma curve as those stored in the screen gamma curve storage unit 73 individually to the number (2) to number (n) image forming apparatuses 100 (Step S206).

Then, the control unit 10 of each sample machine stores the screen gamma curve, which is exported from the target machine, in the screen gamma curve storage unit 73 of the storage unit 70 (Step S207).

In such a manner as described above, in each of the plural image forming apparatuses 100, the common screen gamma curve is held. In this embodiment, it is assumed that the image forming system uses the n pieces of image forming apparatuses of the same type, and it is considered that a difference in screen gamma characteristics among the apparatuses is small. Therefore, such screen gamma curves are not created in the respective machines, but the screen gamma curve is created in one image forming apparatus, and this is shared among the respective image forming apparatuses, whereby processing for creating the screen gamma curve is simplified. Moreover, since a correction amount is common, compression of a correction amount in relative gamma correction to be described later can be achieved, and it becomes possible to implement effective relative gamma correction more easily.

Note that plural types of the screen gamma curves may be created in response to types of such screens for use.

Figure 12:
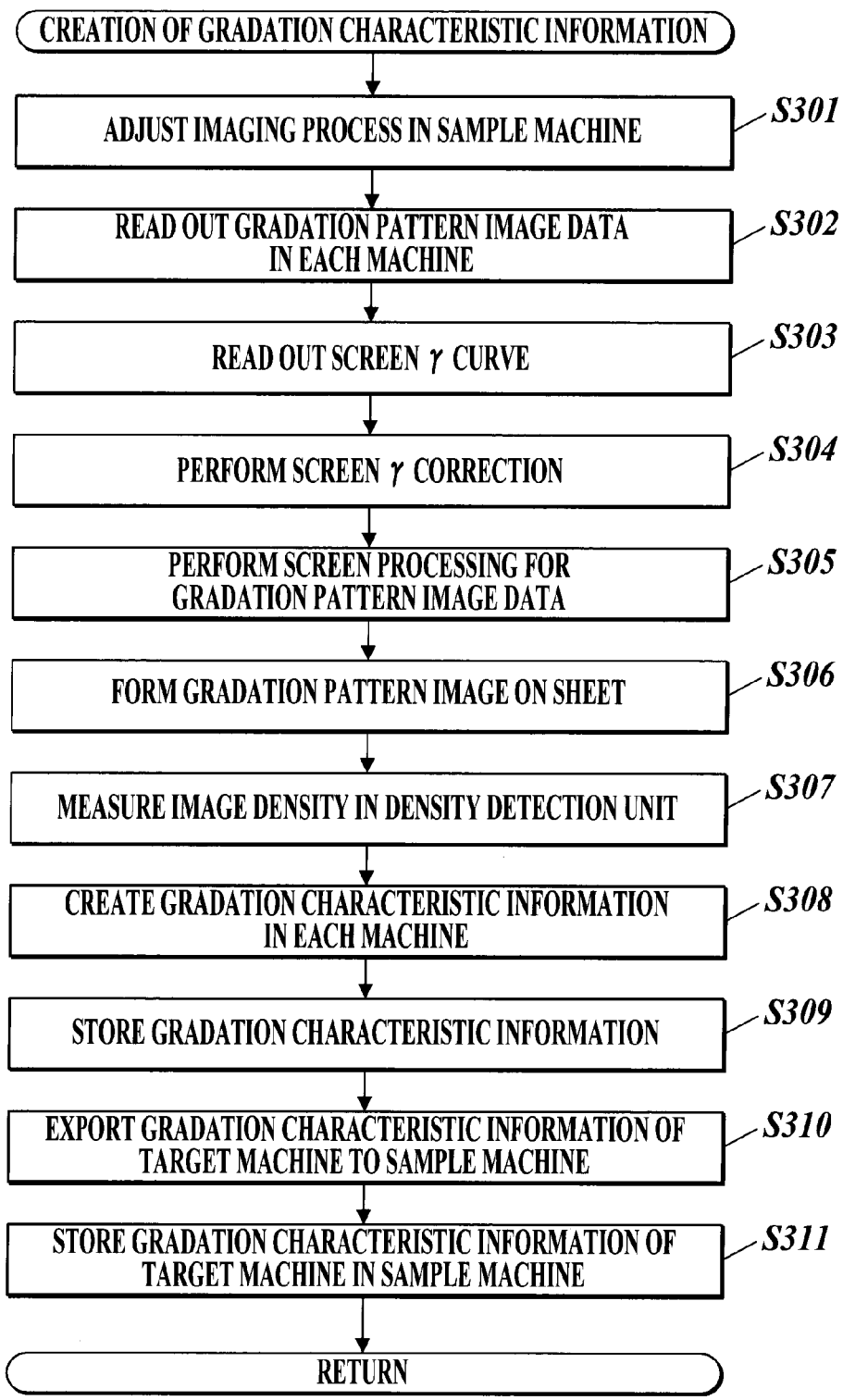
FIG. 12 is a flowchart explaining a procedure for creating gradation characteristic information in the first embodiment.

When the screen gamma curve is obtained in each of the machines in such a manner as mentioned above, then as shown in FIG. 6, gradation characteristic information indicating the gradation characteristics in each of the plural image forming apparatuses 100 is created in each machine (Step S30). That is to say, the control unit 10 of each of the plural image forming apparatuses 100 forms, on the sheet, plural pattern images different in gradation for each of eight colors Y, M, C, K, R, G, B and Pb in the image forming unit 40. The control unit 10 of each of the image forming apparatuses 100 captures, in the density detection unit 60, each of the pattern images formed on the sheet, and creates the gradation characteristic information based on this. Meanwhile, the control unit 10 of the number (1) image forming apparatus 100 as the target machine exports the gradation characteristic information, which is obtained in the machine itself, to the number (2) to number (n) image forming apparatuses 100 as the sample machines. The control unit 10 of each of the sample machines stores and holds the gradation characteristic information exported from the target machine. Here, while referring to FIG. 12, a description is made in detail of a procedure for creating the gradation characteristic information.

First, in each of the number (2) to number (n) image forming apparatuses 100, adjustment of the imaging process is performed (Step S301). Specifically, the control unit 10 of each of the sample machines reads out, from the storage unit 70, density information as the imaging process information exported from the number (1) image forming apparatus 100 as the target machine in such a manner as mentioned above, and density information as the imaging process information of the machine itself. Then, the control unit 10 of each of the sample machines calculates differences in density from the density information of the target machine and the density information of the machine itself. For example, as shown in FIG. 8, with regard to the density measurement values of the color K at the maximum gradation, the density measurement value at the number (2) image forming apparatus 100 is 1.70, and the density measurement value at the target machine is 1.67. Accordingly, a difference in density between the target machine and the number (2) image forming apparatus 100 becomes 0.03. Moreover, in the number (n) imaging forming apparatus 100, since the density measurement value thereof is 1.64, a difference in density from the target machine becomes −0.03.

When the differences in density are calculated in such a manner as described above, the control unit 10 of each sample machine changes a bias voltage of the charging grid high-voltage power supply 403Ka in the image forming unit 40K of the color K, which is shown in FIG. 4, and performs control to adjust a charging voltage in the photosensitive drum 41K through the charger 403K. For example, the control unit 10 of each of the sample machines raises the bias voltage of the charging grid high-voltage power supply 403Ka, and raises the charging voltage of the photosensitive drum 41K, and can thereby increase the density. An example of this is mentioned. In order to raise the density measurement value "1.64" of the number (n) image forming apparatus 100 to "1.67" as the density measurement value of the target machine, the control unit 10 of the machine itself as the number (n) image forming apparatus 100 controls the image forming unit 40 to raise the bias voltage of the charging grid high-voltage power supply 403Ka by 30V. Note that decrease of the density can be realized by lowering the bias voltage.

Moreover, another adjustment method of the imaging process can be realized in such a manner that the control unit 10 of the sample machine adjusts exposure energy of the LD 404Ka by the power controller 404Kb shown in FIG. 4. As an adjustment method of the exposure energy, change of an output pulse width, change of an output voltage, and the like can be applied. For example, the exposure energy of the LD 404Ka is enhanced, whereby a charging voltage of an exposed portion of the photosensitive drum 41K can be further lowered. As a result, the density can be increased. Note that the decrease of the density can be realized by lowering the exposure energy of the LD 404Ka.

Also for the color Y, the color M and the color C, the adjustment of the imaging process can be implemented in a similar way.

Next, in each of the number (1) to number (n) image forming apparatuses 100, gradation pattern image data stored in the gradation pattern image storage unit 71 of the storage unit 70 is read out (Step S302).

Here, a description is made of examples of the gradation pattern image while referring to FIG. 13 to FIG. 18.

For each color of Y, M, C, K, R, G, B and Pb, the gradation pattern image formed on the sheet P includes patches of plural densities in a range from the lowest density (gradation value: 31) to the highest density (gradation value: 255). For example, gradation values of the patches of each color, which re included in the gradation pattern image, are individually 31, 53, 95, 127, 159, 191, 223 and 255. Note that the respective gradation pattern images shown in FIG. 13 to FIG. 18 are merely for the purpose of illustration, and arrangement positions of the respective colors and arrays of the patches are not limited to those shown. Moreover, with regard to the gradation pattern images, it is sufficient if any one of the patterns shown in FIG. 13 to FIG. 18 can be outputted; however, plural types thereof may be outputted and used in combination.

Figure 13:
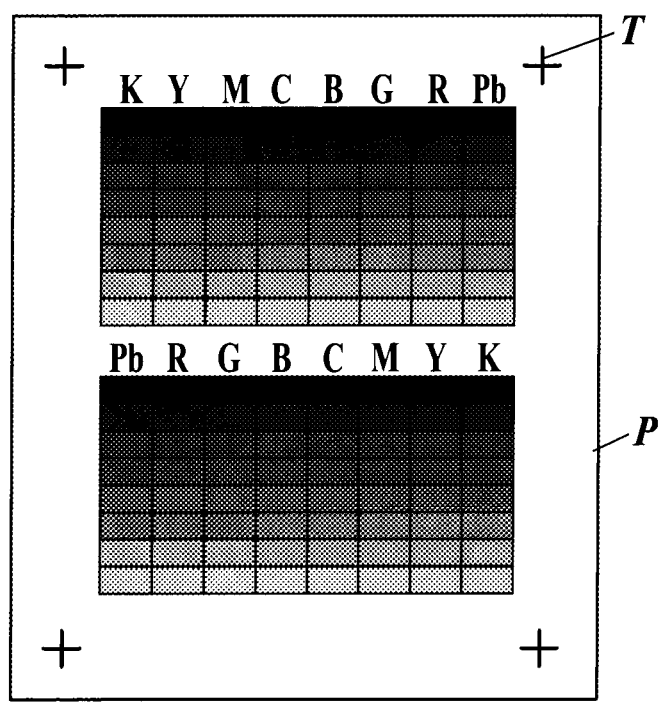
FIG. 13 is a view showing an example of a gradation pattern image.

In an example of the gradation pattern image, which is shown in FIG. 13, in an upper portion thereof, patches of K, Y, M, C, B, G, R and Pb are formed in order from a left side, and in a lower portion thereof, a mirror image pattern in which the patches formed in the upper portion are inverted with respect to a vertical direction taken as an axis is formed. That is to say, in the lower portion, patches are formed in order of Pb, R, G, B, C, M, Y and K from the left side. Such a gradation pattern image as described above is formed, whereby the gamma curve can be created by averaging the detected densities of the patches for each gradation, and an influence by in-plane unevenness can be reduced. Note that the gradation pattern image shown in FIG. 13 is arranged in an inside of cutting register marks arranged individually on four corners of the sheet P. These cutting register marks T are identification information indicating cutting positions of the sheet in the event of book binding and the like. The gradation pattern image is formed in the inside of the cutting register marks, whereby the sheet P becomes spoiled. However, since the patches can be formed in a wide range, the number of sheets necessary to form the gradation pattern image can be reduced. Moreover, in this embodiment, the patches are formed in order from a larger density in order to facilitate detection of a starting position of the gradation pattern image.

Figure 14:
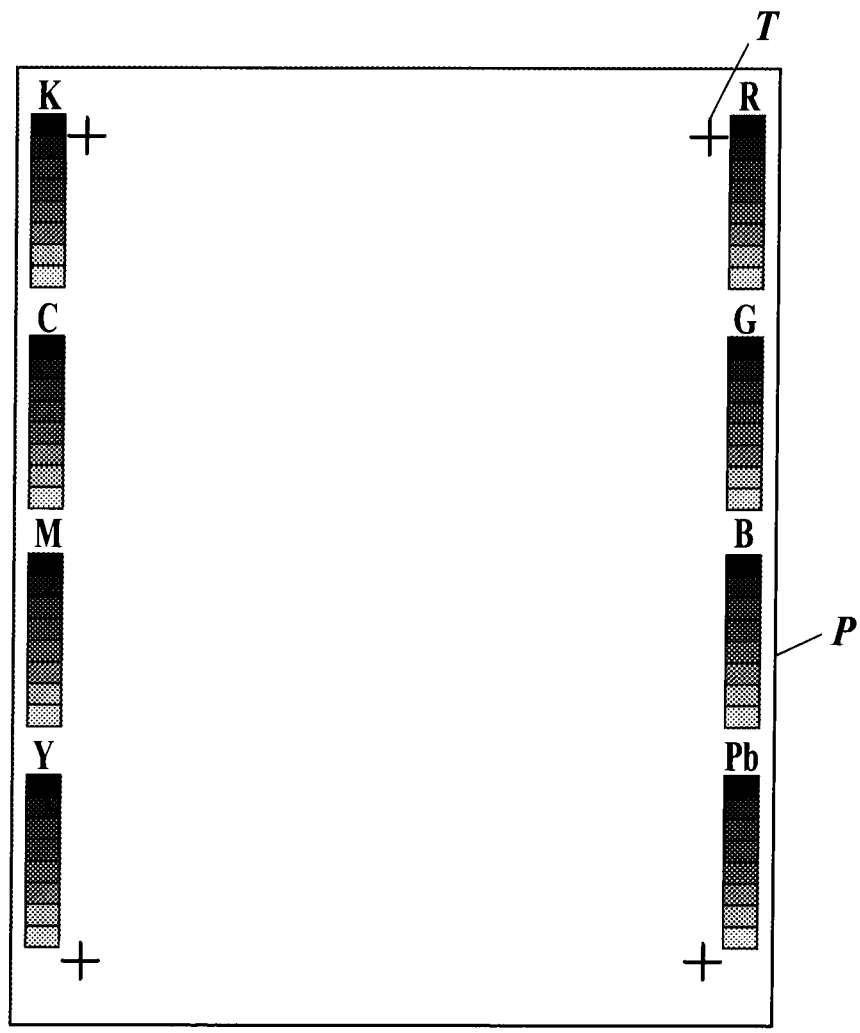
FIG. 14 is a view showing an example of the gradation pattern image.

In an example of the gradation pattern image, which is shown in FIG. 14, the gradation pattern image is formed on left and right end portions of the sheet P, which are also on the outside of the cutting register marks T. That is to say, on the left end portion of the sheet P, the respective patches are longitudinally arranged from an upper side in order of K, C, M and Y, and on the right end portion of the sheet P, the respective patches are longitudinally arranged from the upper side in order of R, G, B and Pb. In this example, when the sheet P is cut by taking the cutting register marks T as guides, the gradation pattern image is also separated at the same time, and accordingly, the sheet P is not spoiled, and cost reduction can be achieved. Moreover, also in this example, the patches are formed in order from a larger density in order to facilitate the detection of the starting position of the gradation pattern image.

Figure 15:
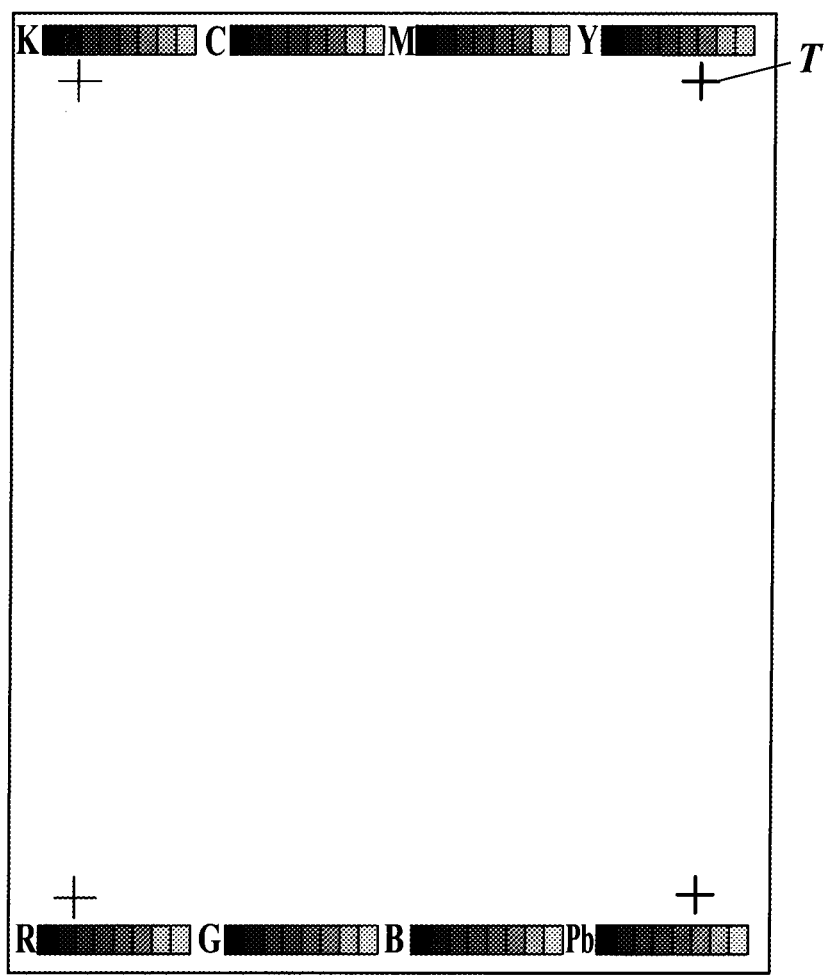
FIG. 15 is a view showing an example of the gradation pattern image.

In an example of the gradation pattern image, which is shown in FIG. 15, the gradation pattern image is formed on upper and lower end portions of the sheet P, which are also on the outside of the cutting register marks T. That is to say, on the upper end portion of the sheet P, the respective patches are laterally arranged from the left side in order of K, C, M and Y, and on the lower end portion of the sheet P, the respective patches are laterally arranged from the left side in order of R, G, B and Pb. Also in this example, when the sheet P is cut by taking the cutting register marks T as guides, the gradation pattern image is also separated at the same time, and accordingly, the sheet P is not spoiled, and the cost reduction can be achieved.

Figure 16:
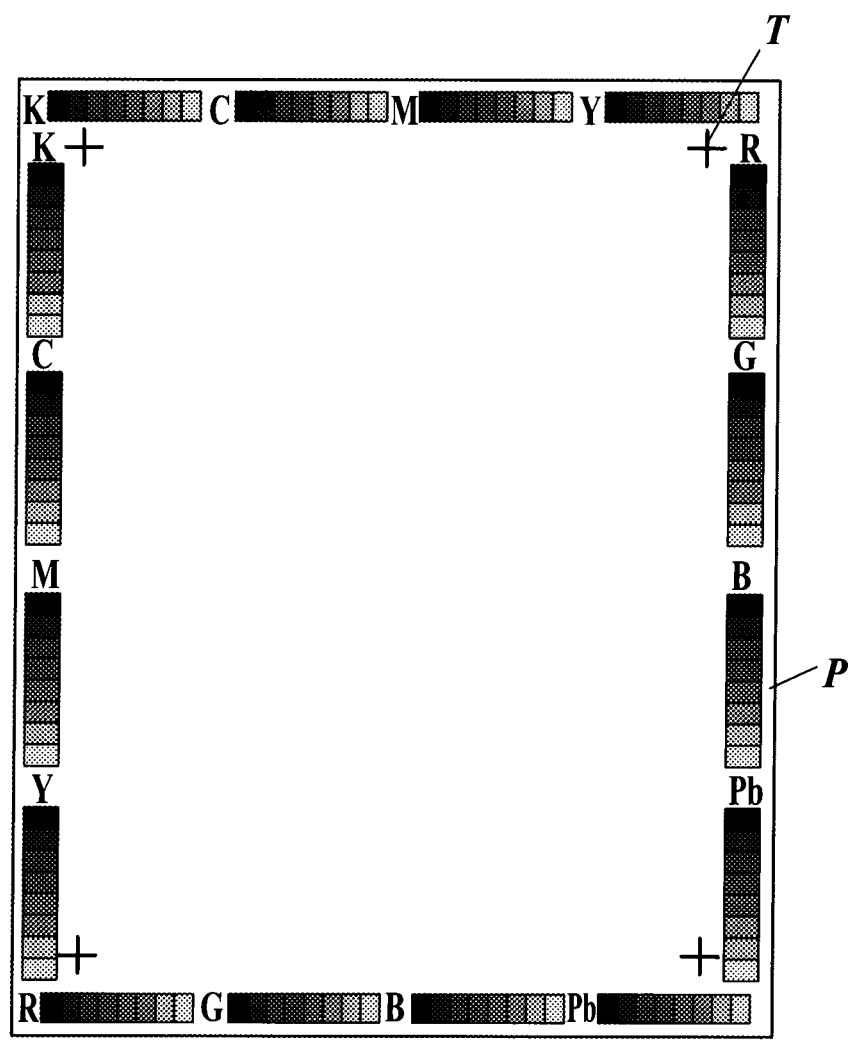
FIG. 16 is a view showing an example of the gradation pattern image.

In an example of the gradation pattern image, which is shown in FIG. 16, the gradation pattern image is formed on the upper/lower and left/right end portions of the sheet P, which are also on the outside of the cutting register marks T. That is to say, on the left end portion of the sheet P, the respective patches are longitudinally arranged from the upper side in order of K, C, M and Y, and on the right end portion of the sheet P, the respective patches are longitudinally arranged from the upper side in order of R, G, B and Pb. Moreover, on the upper end portion of the sheet P, the respective patches are laterally arranged from the left side in order of K, C, M and Y, and on the lower end portion of the sheet P, the respective patches are laterally arranged from the left side in order of R, G, B and Pb. Also in this example, when the sheet P is cut by taking the cutting register marks T as guides, the gradation pattern image is also separated at the same time, and accordingly, the sheet P is not spoiled, and the cost reduction can be achieved. Moreover, such a gradation pattern image as described above is formed, whereby the gamma curve can be created by averaging the detected densities of the patches for each gradation, and the influence by the in-plane unevenness can be reduced.

Figure 17:
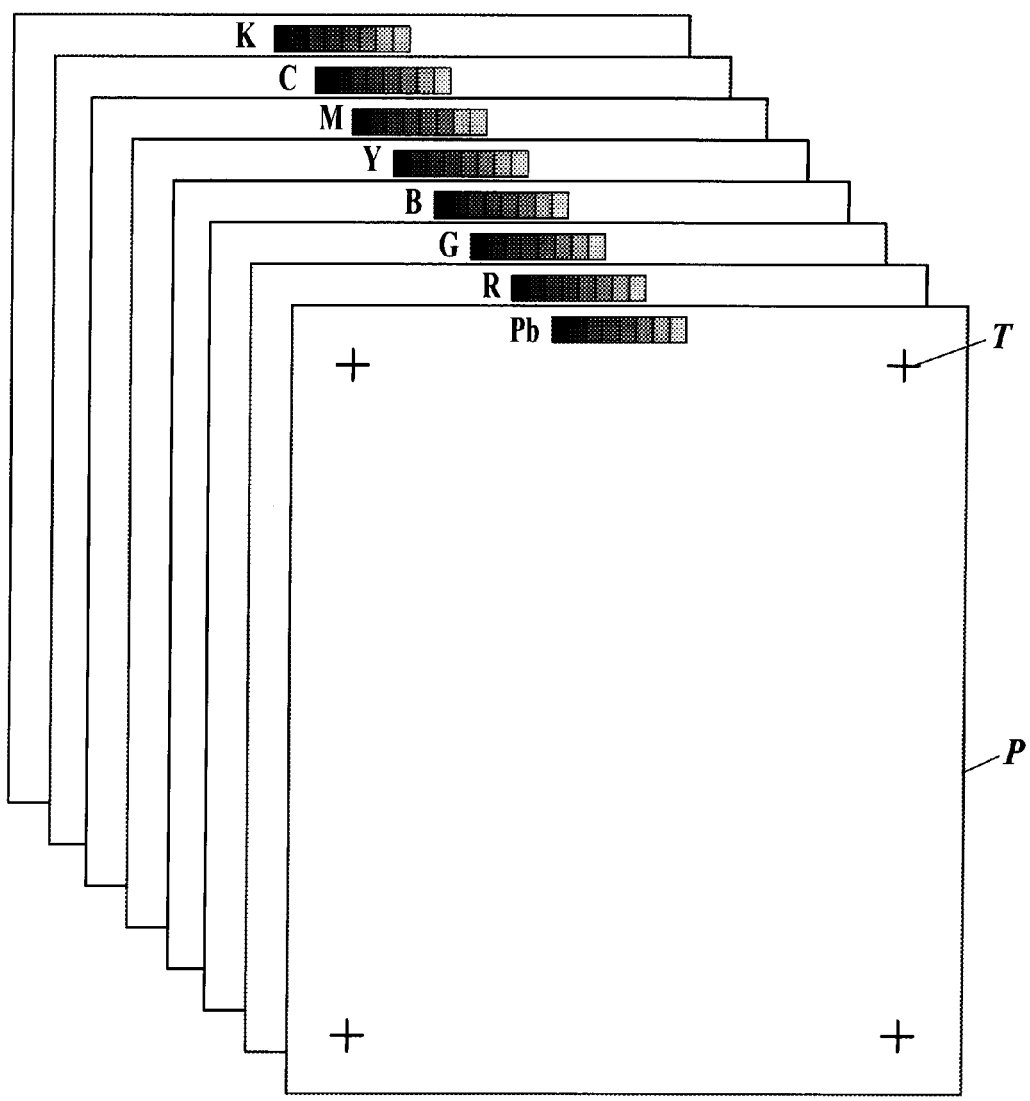
FIG. 17 is a view showing an example of the gradation pattern image.

In an example of the gradation pattern image, which is shown in FIG. 17, the gradation pattern image is formed on upper end portions of the sheets P, which are also on the outside of the cutting register marks T. In this example, the patch of one color is laterally formed for each sheet. In this example, the detection of the densities is performed by a plurality of the sheets. However, when the sheets P are cut by taking the cutting register marks T as guides, the gradation pattern image is also separated at the same time, and accordingly, the sheets P are not spoiled, and the cost reduction can be achieved. Note that the position at which the gradation pattern image is formed is not limited to the one mentioned above.

Figure 18:
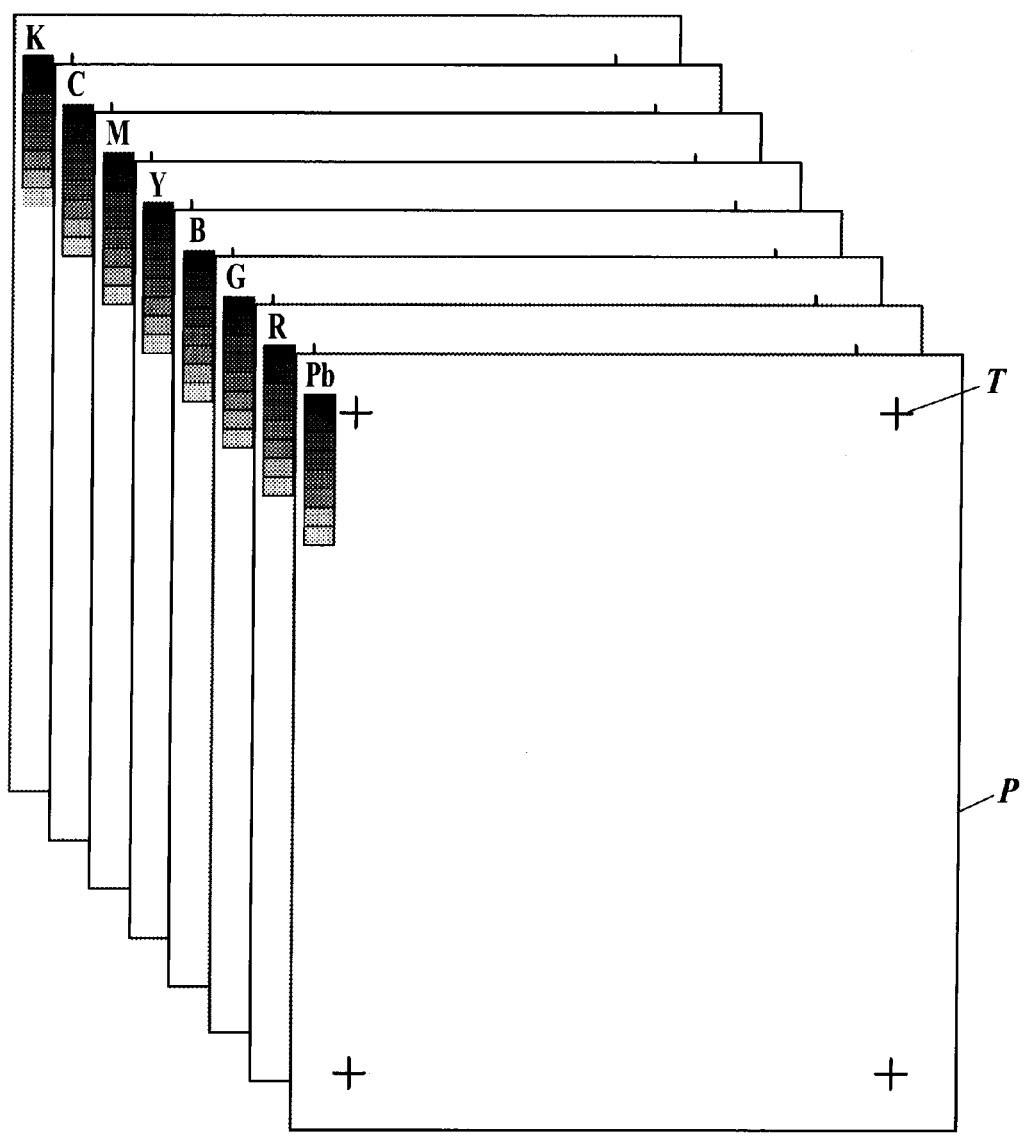
FIG. 18 is a view showing an example of the gradation pattern image.

In an example of the gradation pattern image, which is shown in FIG. 18, the gradation pattern image is formed on upper left end portions of the sheets P, which are also on the outside of the cutting register marks T. In this example, the patch of one color is longitudinally formed for each sheet. Also in this example, the detection of the densities is performed by a plurality of the sheets. However, when the sheets P are cut by taking the cutting register marks T as guides, the gradation pattern image is also separated at the same time, and accordingly, the sheets P are not spoiled, and the cost reduction can be achieved. Note that the position at which the gradation pattern image is formed is not limited to the one mentioned above.

When the gradation pattern image data is read out in such a manner as described above, then as shown in FIG. 12, the screen gamma curve is read out in each of the plural image forming apparatuses 100 (Step S303). Specifically, each control unit 10 of the plural image forming apparatuses 100 reads out the screen gamma curve stored in the screen gamma curve storage unit 73 of the storage unit 70.

Next, each control unit 10 of the plural image forming apparatuses 100 applies the screen gamma curve to the read out gradation pattern image data, and performs screen gamma correction therefor (Step S304).

Then, each control unit 10 of the plural image forming apparatuses 100 performs screen processing for the gradation pattern image data subjected to the screen gamma correction (Step S305). For the screen processing, for example, applicable is screen processing by publicly known AM screen, FM screen and the like.

Then, in the image forming unit 40, each control unit 10 of the plural image forming apparatuses 100 forms the gradation pattern image on the sheet based on the gradation pattern image data subjected to the screen processing (Step S306).

Next, in each of the plural image forming apparatuses 100, density measurement for the respective patches in the gradation pattern image formed on the sheet is performed (Step S307).

Specifically, in such a manner as mentioned above, the control unit 10 of each image forming apparatus 100 obtains an image density signal indicating the reflectivity for each patch, which is measured by the density detection unit 60.

Then, from the received image density signal, the control unit 10 of each image forming apparatus 100 obtains an intermediate signal for specifying a γ value for each output gradation of the patches for each of the respective colors C, M, Y and K as the primary colors, the respective colors of R, G and B as the secondary colors, and Pb as the tertiary color. As shown in FIG. 19, with regard to this intermediate signal, for cyan (C), an intermediate signal is obtained from a signal of R, which is in a complementary color relationship thereto, among such image density signals. Moreover, for magenta (M), an intermediate signal is obtained from a signal of G, which is in a complementary color relationship thereto, among the image density signals. Furthermore, for yellow (Y), an intermediate signal is obtained from a signal of B, which is in a complementary color relationship thereto, among the image density signals. Moreover, for black (K), an intermediate signal may be obtained from any signal, and in this embodiment, the intermediate signal is obtained from the signal of G.

Meanwhile, for the respective colors of R, G, B and Pb as the secondary colors and the tertiary color, for example, among a luminance signal (Y) and color difference signals (Cr/Cb), which are specified from the respective signals of R, G and B, the luminance signal (Y) is obtained as an intermediate signal. For example, the luminance signal (Y) can be obtained by the following expression (1). In the following expression, (R), (G) and (B) are γ values of the respective colors of R, G and B, which are specified from the respective signals of R, G and B of the image density signal, respectively:

$$Y = 0.299 \cdot (R) + 0.587 \cdot (G) + 0.114 \cdot (B) \quad (1)$$

Note that the intermediate signals in the secondary colors and the tertiary color are not limited to those calculated by the above-mentioned expression (1), and may be created in an arbitrary ratio of the respective colors of R, G and B, for example, such that the intermediate signal is obtained by mixing the γ values of the respective R, G and B colors in a ratio where R:G:B=3:6:1.

Note that, in this embodiment, plural spots are measured for one patch in the density detection unit 60, and the image density signal for each measurement spot is outputted to the control unit 10. Then in the control unit 10, an average value of the γ values specified from such image density signals is calculated for each gradation, and a γ value for use in the gamma curve is obtained. In this case, such a procedure may be adopted, in which plural pieces of the gradation pattern images are outputted, all of the pieces are subjected to the measurement, and the average value of the γ values for each gradation is calculated.

Subsequently, based on the γ value for each gradation of each color, which is obtained as described above, the control unit 10 of each image forming apparatus 100 creates gradation characteristic information, which is formed into a table, as shown in FIG. 20A and FIG. 20B (Step S308). Here, for example, FIG. 20A is gradation characteristic information showing a relationship between input gradation values of the color C in the number (1) image forming apparatus 100 and the γ values obtained as a result of the measurement. Moreover, FIG. 20B is gradation characteristic information showing a relationship between input gradation values of the color C in the number (2) image forming apparatus 100 and the γ values obtained as a result of the measurement. Note that, also for the respective colors of Y, M and K, the gradation characteristic information is created in a similar way. Moreover, also for the other image forming apparatuses 100, the gradation characteristic information for the respective colors of Y, M, C and K is created in a similar way.

Next, in the number (1) image forming apparatus 100 as the target machine, the control unit 10 of each image forming apparatus 100 stores the gradation characteristic information, which is created as described above, in the target gradation characteristic storage unit 74 of the storage unit 70, and in each of the number (2) to number (n) image forming apparatuses 100 as the sample machines, the control unit 10 of each image forming apparatus 100 stores the gradation characteristic information, which is created as described above, in the sample machine gradation characteristic storage unit 75 of the storage unit 70 (Step S309). Note that, in this embodiment, in the number (1) image forming apparatus 100 as the target machine, the relative gamma correction to be described later is not implemented, and accordingly, the gradation characteristic information does not have to be stored or held.

Next, the control unit 10 of the number (1) image forming apparatus 100 as the target machine exports the gradation characteristic information, which is created in the machine itself, as the target gradation characteristic information to each of the number (2) to number (n) image forming apparatuses 100 as the sample machines (Step S310).

Then, the control unit 10 of each of the sample machines stores the exported target gradation characteristic information in the target gradation characteristic storage unit 74 (Step S311).

When the gradation characteristic information is obtained in each of the machines in such a manner as described above, then as shown in FIG. 6, the relative gamma curve is created in each of the number (2) to number (n) image forming apparatuses 100 as the sample machines (Step S40).

Figure 21:
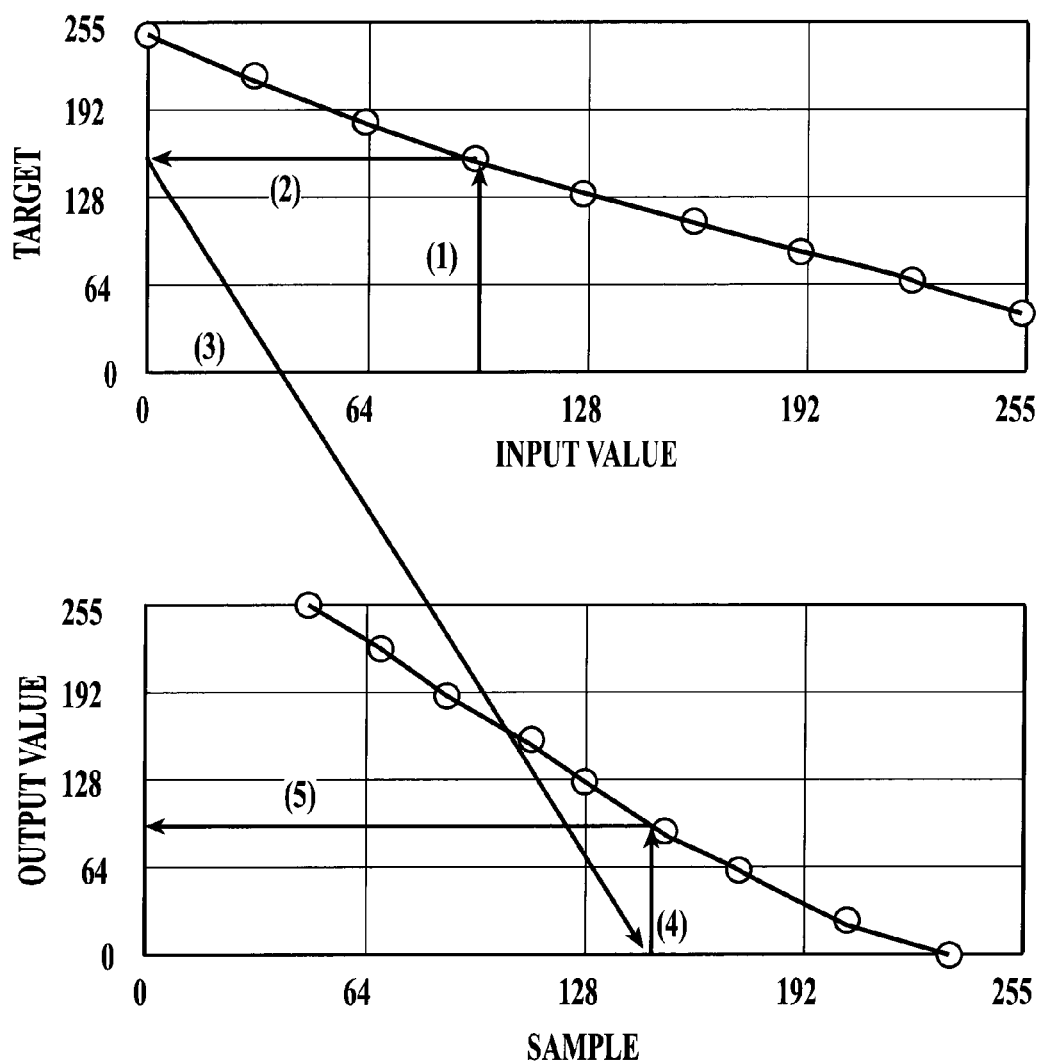
FIG. 21 shows graphs explaining a relationship between a gradation value and a γ value.

Specifically, for example, the control unit 10 of the number (2) image forming apparatus 100 reads out the target gradation characteristic information, which is shown in FIG. 20A, from the target gradation characteristic storage unit 74, and reads out the gradation characteristic information of the machine itself, which is shown in FIG. 20B, from the sample machine gradation characteristic storage unit 75. When these pieces of the gradation characteristic information are plotted, graphs as shown in FIG. 21 are formed. Here, the upper graph of FIG. 21 shows a relationship of the γ value with respect to the input gradation value in the target gradation characteristic information, and the lower graph of FIG. 21 shows a relationship of the gradation value (input gradation value) with respect to the γ value, which is obtained as a result of the measurement, in the gradation characteristic information obtained in the number (2) image forming apparatus 100. Specifically, the gradation value shown in the lower graph of FIG. 21 becomes an output gradation value after the color adjustment.

Note that, in FIG. 21, sections among the respective points are represented by curves subjected to polynomial approximation.

The control unit 10 of the number (2) image forming apparatus 100 associates each γ value in the target gradation characteristic information, which is obtained as described above, and each γ value in the gradation characteristic information, which is obtained in the machine itself as the sample machine, with each other, and creates the relative gamma curve in which the output gradation value is obtained from the input gradation value. More details are described while referring to FIG. 21. For the input gradation value, the control unit 10 of the number (2) image forming apparatus 100 refers to the γ value corresponding to each gradation value in the target gradation characteristic information, and calculates the γ value by the polynomial approximation ((1) to (2)), and for the calculated γ value, the control unit 10 concerned refers to the γ value corresponding to each gradation value in the gradation characteristic information obtained in the machine itself as the sample machine, and calculates the gradation value by the polynomial approximation ((3) to (5)). In such a way, the control unit 10 concerned obtains the output gradation value from the input gradation value. Then, the control unit 10 of the number (2) image forming apparatus 100 obtains in advance the output gradation value with respect to the input gradation value for each of the gradations from 0 to 255 in such a manner as mentioned above, forms these values into the table, and thereby creates the relative gamma curve. Such creation of the relative gamma curve is performed for each of the colors of C, M, Y, K, R, G, B and Pb.

Note that, in this embodiment, the output gradation value is calculated from the input gradation value by using the polynomial approximation; the output gradation value may be calculated from the input gradation value by using other algorithms such as spline interpolation and linear interpolation.

Such creation of the relative gamma curve as described above is also implemented in the other sample machines.

The control unit 10 of the other sample machines stores the relative gamma curve, which is creased as described above, in the relative gamma curve storage unit 72 (Step S50).

Figure 22:
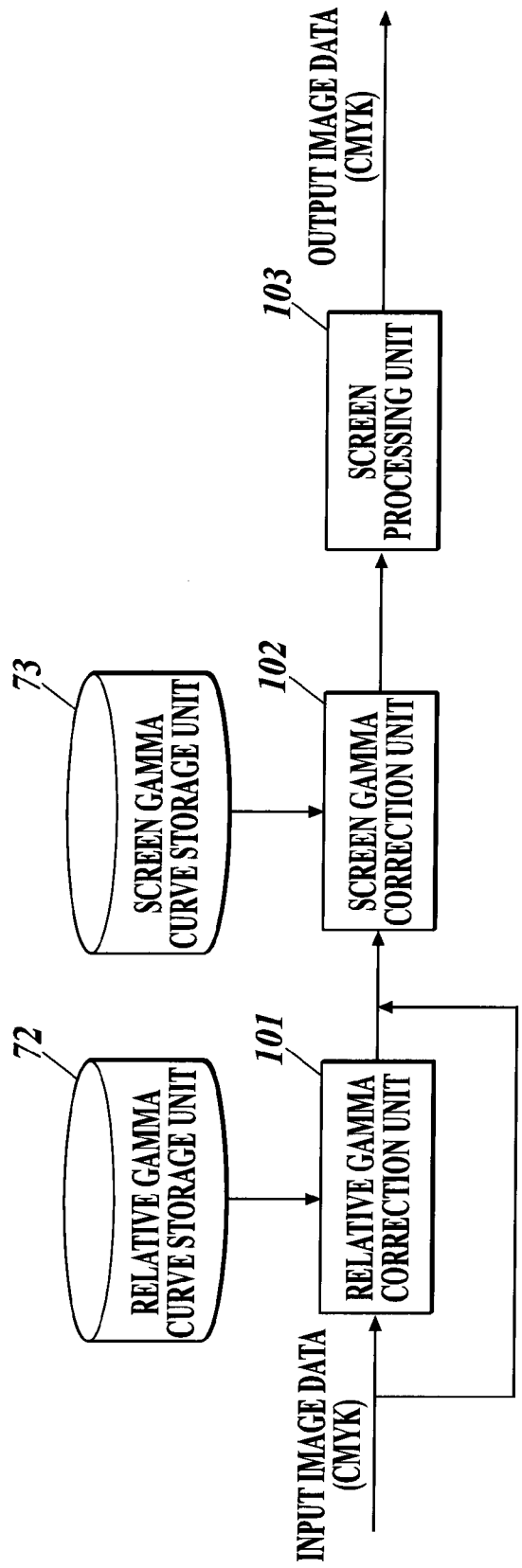
FIG. 22 is a schematic block diagram explaining a procedure of the color adjustment.
Figure 23:
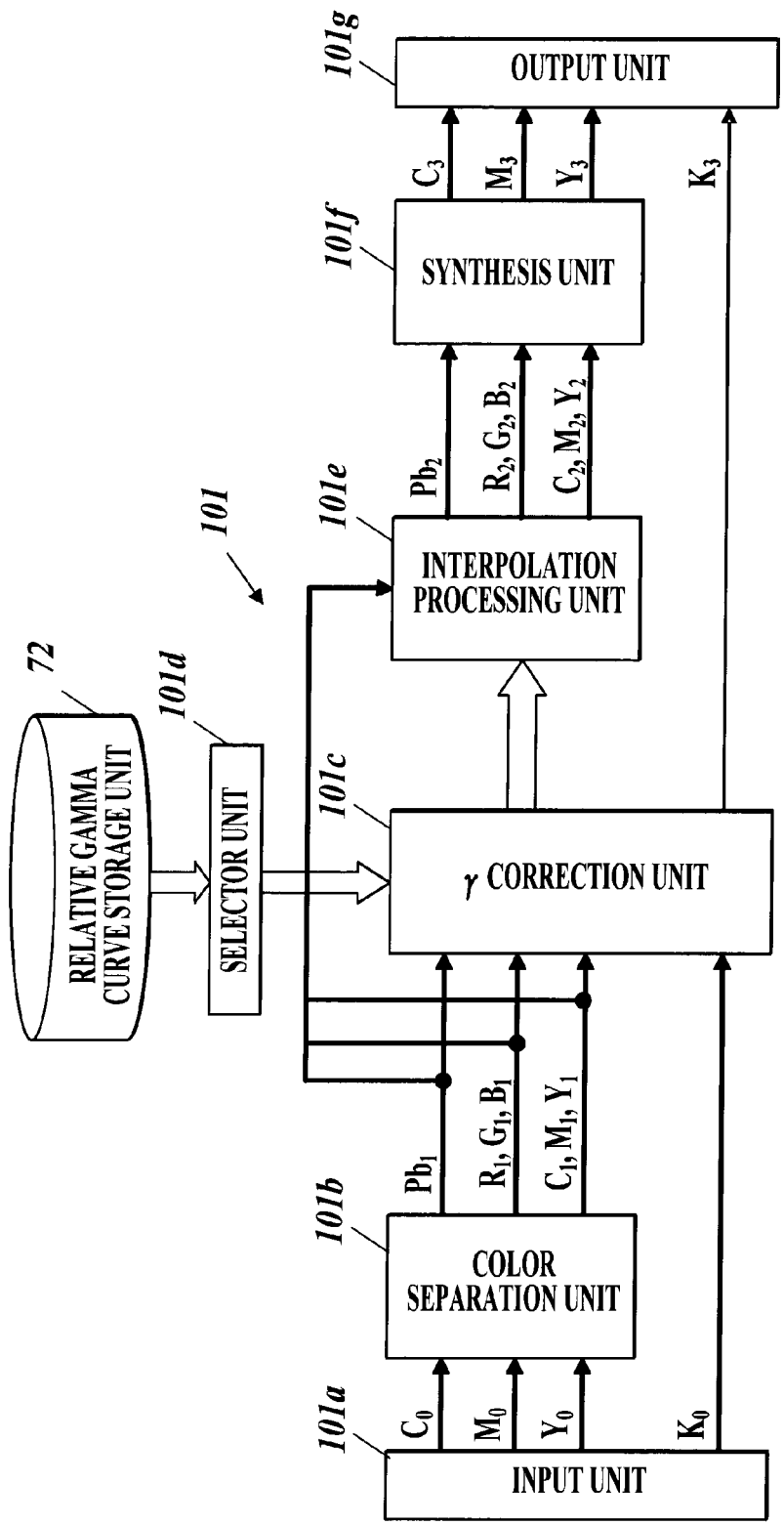
FIG. 23 is a schematic block diagram explaining a procedure of relative gamma correction.

Next, while referring to FIG. 22 and FIG. 23, a description is made of a procedure of the color adjustment performed based on the relative gamma curve and the screen gamma curve, which are created as described above. The color adjustment in this embodiment is realized by the functions of the respective units as shown in FIG. 22 and FIG. 23.

Note that, in this embodiment, such a configuration is adopted, in which the functions of the respective units are realized by software processing implemented by cooperation between the CPU and the programs stored in the ROM; however, the functions concerned may be realized by including a circuit, an exclusive processor and the like, which serve for allowing these respective units to function.

Moreover, in this embodiment, in each of the number (2) to number (n) image forming apparatuses 100 as the sample machines, in the event of implementing the image formation that is based on the image data, the adjustment of the above-mentioned imaging process is performed in advance so that the density in the maximum gradation can match with that of the number (1) image forming apparatus 100 as the target machine.

As shown in FIG. 22, in the case of the sample machine, the image data (input image data) indicating the respective gradation values of C, M, Y and K is inputted to a relative gamma correction unit 101, and relative gamma correction processing is implemented. That is to say, in each of the number (2) to number (n) image forming apparatuses 100, the input image data is inputted to the relative gamma correction unit 101. Meanwhile, in the number (1) image forming apparatus 100 as the target machine, the input image data is not inputted to the relative gamma correction unit 101, but is inputted to a screen gamma correction unit 102.

In the input image data inputted to the relative gamma correction unit 101, the relative gamma curve created as mentioned above is read out from the relative gamma curve storage unit 72, and is subjected to the gamma correction in such a manner as follows.

Specifically, as shown in FIG. 23, when the data indicating the respective gradation values of C, M, Y and K is inputted to an input unit 101a, the input unit 101a outputs $C_0$, $M_0$ and $Y_0$, which are data indicating the gradation values of C, M and Y, respectively, to a color separation unit 101b, and outputs $K_0$ as data, which indicates the gradation value of K, to a γ correction unit 101c. In this embodiment, the gradation value of K is not subjected to color separation to be described later, and is outputted after being subjected only to the γ correction.

Upon receiving the respective pieces of $C_0$, $M_0$ and $Y_0$ data, the color separation unit 101b extracts the respective components of the primary colors (CMY), the secondary colors (RGB) and the tertiary color (Pb) based on these pieces of the data Specifically, first, the color separation unit 101b extracts such a tertiary color component ($Pb_1$). That is to say, the color separation unit 101b specifies a minimum value (tertiary color component value) among the respective pieces of the $C_0$, $M_0$ and $Y_0$ data, sets this tertiary color component value for each of C, M and Y, and defines resultants as $Pb_1$. Note that, in the case where the value of any of $C_0$, $M_0$ and $Y_0$ is 0, $Pb_1$ is not extracted.

Next, the color separation unit 101b extracts such secondary color components ($R_1$, $G_1$, $B_1$) from the respective pieces of the $C_0$, $M_0$ and $Y_0$ data. Specifically, the color separation unit 101b specifies a second smaller value (secondary color component value) among the respective pieces of the $C_0$, $M_0$ and $Y_0$ data, and sets secondary color component values for two colors excluding a color corresponding to the data with the minimum value among C, M and Y. As a result, any one of $R_1$, $G_1$ and $B_1$ is extracted. For example, in the case where the secondary color component values are set for C and M, then $B_1$ is extracted, in the case where the secondary color component values are set for C and Y, then $G_1$ is extracted, and in the case where the secondary color component values are set for M and Y, $R_1$ is extracted. Note that, in the case where the values of any two of $C_0$, $M_0$ and $Y_0$ are 0, then any of $C_0$, $M_0$ and $Y_0$ is not extracted.

Next, the color separation unit 101b extracts such primary color components ($C_1$, $M_1$, $Y_1$) from the respective pieces of the $C_0$, $M_0$ and $Y_0$ data. That is to say, the color separation unit 101b specifies a maximum value (primary color component value) among the respective pieces of the $C_0$, $M_0$ and $Y_0$ data, and sets a primary color component values for a color corresponding to the data with the maximum value among C, M and Y. As a result, any one of $C_1$, $M_1$ and $Y_1$ is extracted.

The color separation unit 101b outputs the respective pieces of the $Pb_1$, $R_1$, $G_1$, $B_1$, $C_1$, $M_1$ and $Y_1$, which are extracted as described above, to the γ correction unit 101c and an interpolation processing unit 101e.

When the respective pieces of the $Pb_1$, $R_1$, $G_1$, $B_1$, $C_1$, $Y_1$ and $K_0$ are inputted to the γ correction unit 101c, the relative gamma curve corresponding to each piece of the inputted data is read out from the relative gamma curve storage unit 72 by a selector unit 101d, and is then inputted to the γ correction unit 101c.

Then, for each piece of the inputted data, the γ correction unit 101c performs the γ correction using the relative gamma curve.

That is to say, with regard to $Pb_1$ as the data of the tertiary color, the γ correction unit 101c uses the relative gamma curve for Pb, and obtains an output value $Pb_1$ (γPb) from $Pb_1$ as the input value.

Moreover, with regard to $R_1$, $G_1$ and $B_1$ as the data of the secondary colors, the γ correction unit 101c uses the relative gamma curves for R, G and B, and obtains output values $R_1$ (γR) $G_1$ (γG) and $B_1$(γB) from $R_1$, $G_1$ and $B_1$ as the input values. Furthermore, with regard to $R_1$, $G_1$ and $B_1$, the γ correction unit 101c uses the relative gamma curve for Pb as the tertiary color, and obtains output values $R_1$ (γPb), $G_1$ (γPb) and $B_1$ (γPb) from $R_1$, $G_1$ and $B_1$ as the input values.

Moreover, with regard to $C_1$, $M_1$ and $Y_1$ as the data of the primary colors, the γ correction unit 101c uses the relative gamma curves for C, M and Y, and obtains output values $C_1$ (γC) $M_1$ (γM) and $Y_1$ (γY) from $C_1$, $M_1$ and $Y_1$ as the input values. Furthermore, with regard to $C_1$, $M_1$ and $Y_1$, the γ correction unit 101c uses the relative gamma curves for R, G and B as the secondary colors, and obtains output values from $C_1$, $M_1$ and $Y_1$ as the input values. Here, the output values obtained from $C_1$, $M_1$ and $Y_1$ by using the relative gamma curves for R, G and B depend on the secondary color components extracted in the color separation unit 101b. For example, in the case where the extracted primary color component is $C_1$, and the extracted secondary color component is $G_1$, the relative gamma curve for G is used, and the output value $C_1$ (γG) is obtained from the input value $C_1$.

Moreover, with regard to $K_0$, the γ correction unit 101c uses the relative gamma curve for K, and obtains an output value $K_3$ from $K_0$ as the input value.

Among the respective output values obtained as described above, the γ correction unit 101c outputs $K_3$ to an output unit 101g, and outputs the other output values to the interpolation output unit 101e.

The interpolation processing unit 101e performs interpolation processing for the respective received output values, and outputs results thereof to a synthesis unit 101f.

Specifically, with regard to the secondary color components, the interpolation processing unit 101e performs interpolation between the output values $R_1$ (γR), $G_1$ (γG) and $B_1$ (γB), which are obtained by using the relative gamma curves for R, G and B as the secondary colors, and the output values $R_1$ (γPb), $G_1$ (γPb) and $B_1$ (γPb), which are obtained by using the relative gamma curve for Pb as the tertiary color. Weighting of the interpolation is determined by ratios between $R_1$, $G_1$ and $B_1$ and $Pb_1$, which are inputted from the color separation unit 101b. Each of $R_2$, $G_2$ and $B_2$, which are obtained by performing the interpolation as mentioned above, is obtained by any of the following expressions (2) to (4):

$$R_2 = \{Pb_1 \cdot R_1(\gamma Pb) + (R_1 - Pb_1) \cdot R_1(\gamma R)\}/R_1 \quad (2)$$

$$G_2 = \{Pb_1 \cdot G_1(\gamma Pb) + (G_1 - Pb_1) \cdot G_1(\gamma G)\}/G_1 \quad (3)$$

$$B_2 = \{Pb_1 \cdot B_1(\gamma Pb) + (B_1 - Pb_1) \cdot B_1(\gamma B)\}/B_1 \quad (4)$$

Moreover, with regard to the primary color components, the interpolation processing unit 101e performs interpolation between the output values $C_1$ (γC), $M_1$ (γM) and $Y_1$ (γY), which are obtained by using the relative gamma curves for C, M and Y as the primary colors, and the output values $C_1$ (γG), $C_1$ (γB), $M_1$ (γR) $M_1$ (γB), $Y_1$(γG) and $Y_1$(γR), which are obtained by using the relative gamma curve for R, G and B as the secondary colors. Weighting of the interpolation is determined by ratios between C1, M1 and Y1 and R1, G1 and B1, which are inputted from the color separation unit 101b. Each of $C_2$, $M_2$ and $Y_2$, which are obtained by performing the interpolation as mentioned above, is obtained by any of the following expressions (5) to (10):

$$C_2 = \{G_1 \cdot C_1(\gamma G) + (C_1 - G_1) \cdot C_1(\gamma C)\}/C_1 \quad (5)$$

$$C_2 = \{B_1 \cdot C_1(\gamma B) + (C_1 - B_1) \cdot C_1(\gamma C)\}/C_1 \quad (6)$$

$$M_2 = \{R_1 \cdot M_1(\gamma R) + (M_1 - B_1) \cdot M_1(\gamma M)\}/M_1 \quad (7)$$

$$M_2 = \{B_1 \cdot M_1(\gamma B) + (M_1 - B_1) \cdot M_1(\gamma M)\}/M_1 \quad (8)$$

$$Y_2 = \{G_1 \cdot Y_1(\gamma G) + (Y_1 - G_1) \cdot Y_1(\gamma Y)\}/Y_1 \quad (9)$$

$$Y_2 = \{R_1 \cdot Y_1(\gamma R) + (Y_1 - R_1) \cdot Y_1(\gamma Y)\}/Y_1 \quad (10)$$

The interpolation processing unit 101e outputs the values ($R_2$, $G_2$, $B_2$, $C_2$, $M_2$ and $Y_2$), which are obtained as described, to the synthesis unit 101f. Note that the output value $Pb_1$ (γPb) inputted to the interpolation processing unit 101e is not subjected to the interpolation processing, and the value concerned is outputted as $Pb_2$ to the synthesis unit 101f.

The synthesis unit 101f synthesizes the respective values received from the interpolation processing unit 101e, and decides the respective gradation values of C, M and Y, which are to be outputted to the output unit 101g.

Specifically, the synthesis unit 101*f* compares the respective gradation values C', M' and Y', which are specified by $Pb_2$, the respective gradation values C", M" and Y", which are specified by $R_2$, $G_2$ and $B_2$, and the respective gradation values C''', M''' and Y''', which are specified by $C_2$, $M_2$ and $Y_2$, with one another, and thereby decides final output values $C_3$, $M_3$ and $Y_3$. That is to say, the synthesis unit 101*f* extracts the maximum value among C', C" and C''' to then define the extracted maximum value as $C_3$, extracts the maximum value among M', M" and M''' to then define the extracted maximum value as $M_3$, extracts the maximum value among Y', Y" and Y''' to then define the extracted maximum value as $Y_3$, and thereby decides the final output values $C_3$, $M_3$ and $Y_3$.

The synthesis unit 101 outputs $C_3$, $M_3$ and $Y_3$, which are decided as described above, to the output unit 101*g*.

The output unit 101*g* coverts the received $C_3$, $M_3$, $Y_3$ and $K_3$ into data indicating the respective corrected gradation values of C, M, Y and K, and then outputs the data concerned.

Figure 24:
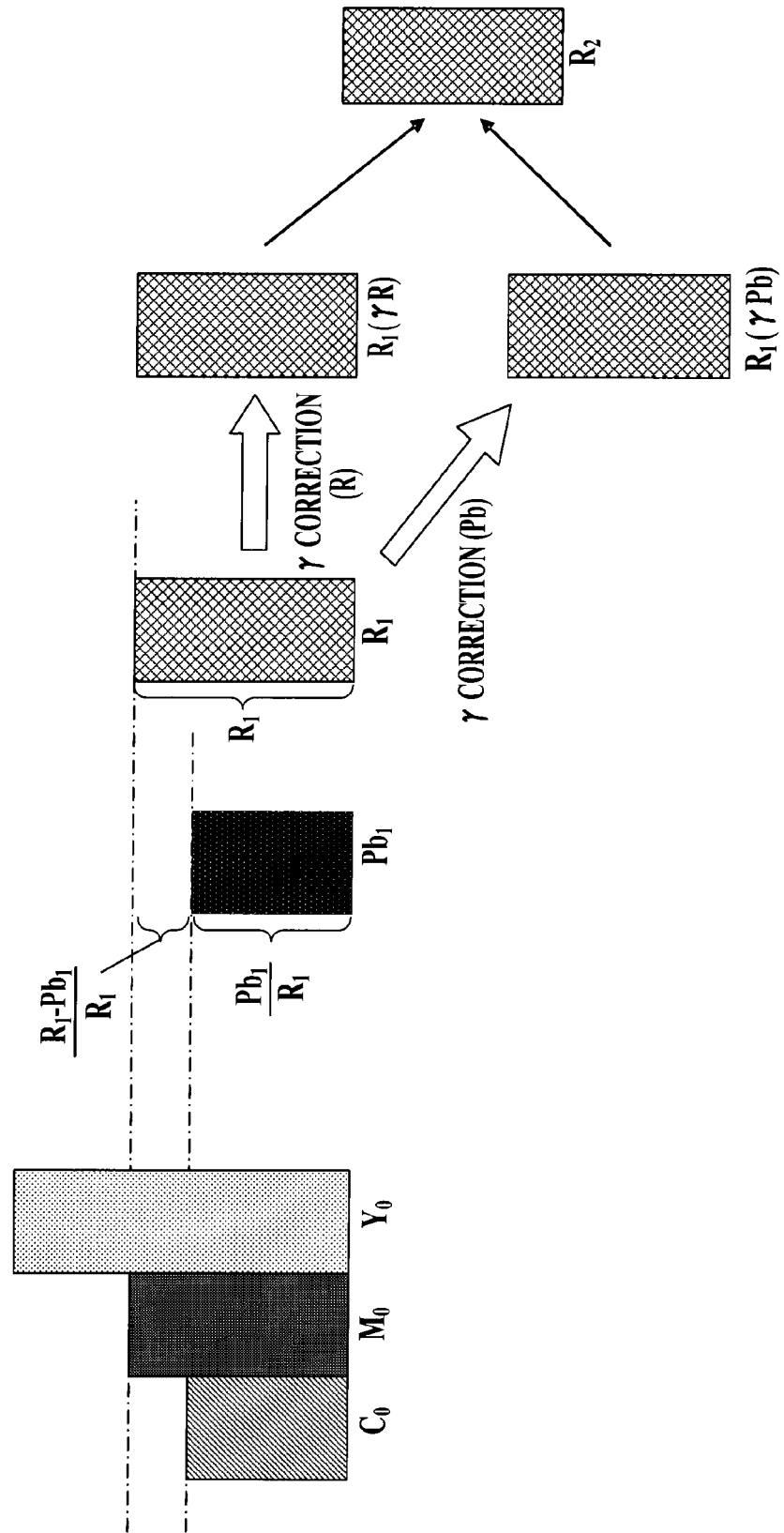
FIG. 24 is a view explaining interpolation processing.
Figure 25:
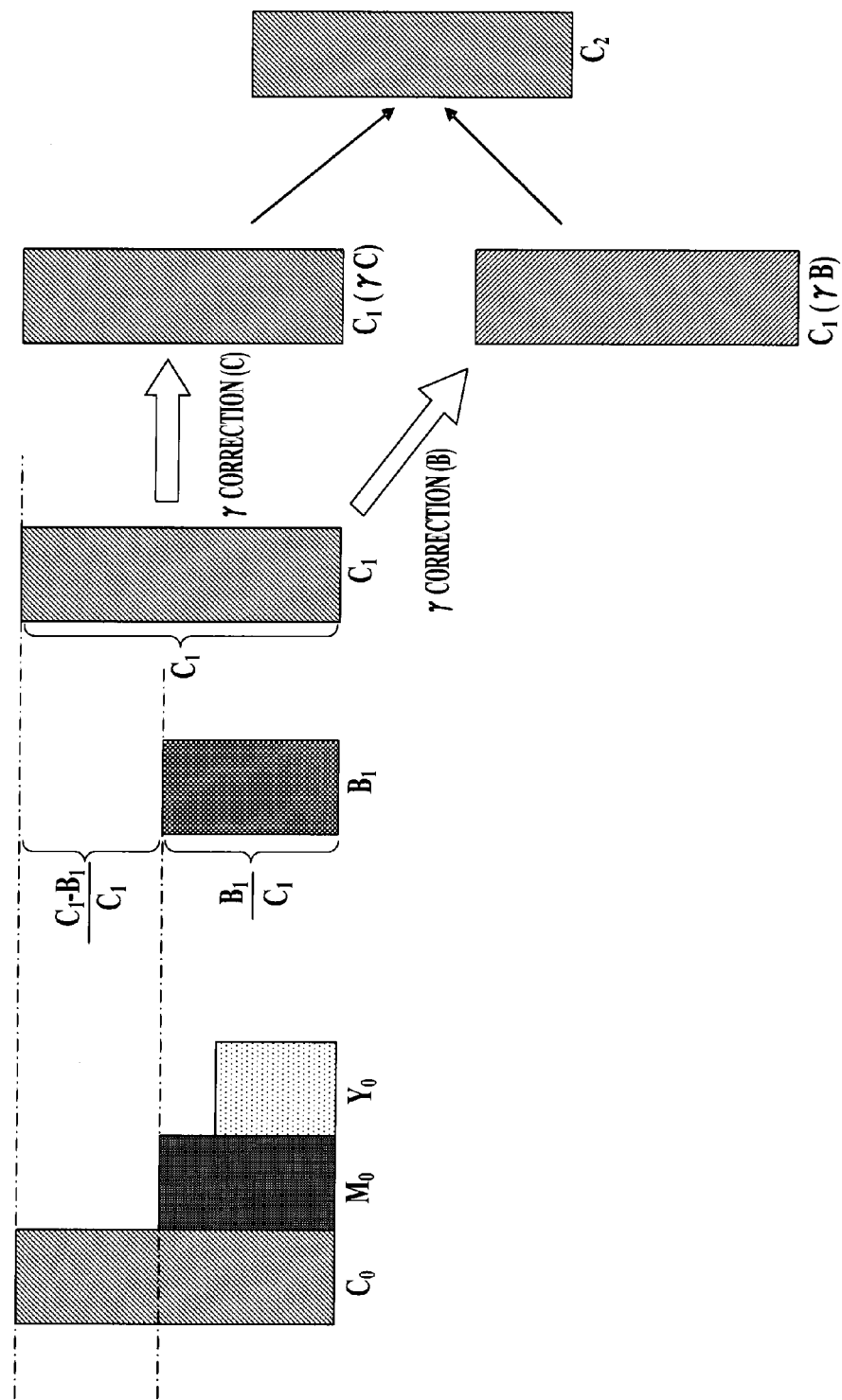
FIG. 25 is a view explaining the interpolation processing.
Figure 26:
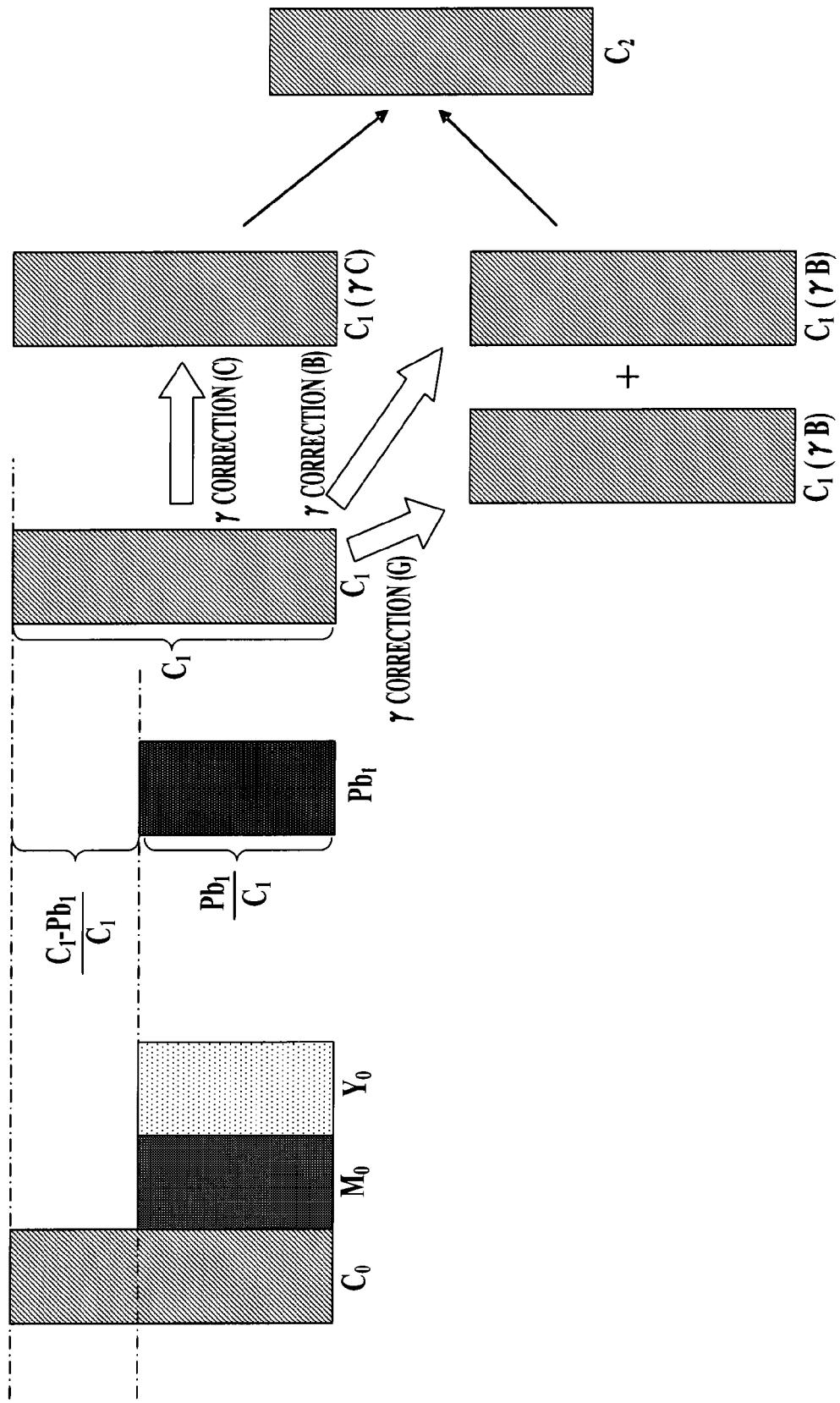
FIG. 26 is a view explaining the interpolation processing.

While referring to FIG. 24 to FIG. 26, a description is made of examples of the color separation, the γ correction and the interpolation processing, which are realized by such a configuration as described above. Note that the interpolation processing shown below is merely examples, and a method for the interpolation processing is not limited to these.

In an example shown in FIG. 24, in the color separation unit 101*b*, $Pb_1$ as the tertiary color component is extracted based on $C_0$, $M_0$ and $Y_0$, which are outputted from the input unit 101*a*. In this case, since the value indicated by the data $C_0$ corresponding to cyan is the smallest, the tertiary color component value of $Pb_1$ becomes the same value as that of $C_0$.

Moreover, the secondary color component is extracted in the color separation unit 101*b*. In this case, since data with the color corresponding to $C_0$ as the minimum value among the respective pieces of the $C_0$, $M_0$ and $Y_0$ data is cyan, $R_1$ indicating red composed of two colors (magenta, yellow) excluding this is extracted as the secondary color component. Moreover, at this time, data with the second smaller value among the respective pieces of $C_0$, $M_0$ and $Y_0$ data is $M_0$ corresponding to magenta, the secondary color component value becomes the same value as that of $M_0$.

Furthermore, since the data with the maximum value among the respective pieces of the $C_0$, $M_0$ and $Y_0$ data is $Y_0$, the primary color component extracted in the color separation unit 101*b* becomes $Y_1$ indicating yellow, and a primary color component value thereof becomes the same value as that of $Y_0$.

Next, in the γ correction unit 101*c*, the γ correction for the extracted primary to tertiary color components is performed. Note that, in the example shown in FIG. 24, a description is made only of the γ correction and the interpolation processing for $R_1$ as the secondary color component, and a description of the γ correction and the interpolation processing for the other color components is omitted.

First, the γ correction is performed for the secondary color component $R_1$ by using the relative gamma curve for R, and the output value $R_1$ (γR) is obtained. Moreover, the γ correction is performed for the secondary color component $R_1$ by using the relative gamma curve for Pb, and the output value $R_1$ (γPb) is obtained.

Then, in the interpolation processing unit 101*e*, the interpolation is performed between the output value $R_1$ (γR) and the output value $R_1$ (γPb), which are obtained as described above. In this case, the above-mentioned expression (2) is applied, and by a ratio between (R—$Pb_1$) and $Pb_1$, the interpolation is performed between the output value $R_1$ (γR) and the output value $R_1$ (γPb). As a result, $R_2$ is calculated as the corrected secondary color component.

In an example shown in FIG. 25, in the color separation unit 101*b*, $Pb_1$ as the tertiary color component is extracted as mentioned above based on $C_0$, $M_0$ and $Y_0$, which are outputted from the input unit 101*a*.

Moreover, the secondary color component is extracted in the color separation unit 101*b*. In this case, since the data with the minimum value among the respective pieces of $C_0$, $M_0$ and $Y_0$ data is $Y_0$, $B_1$ indicating blue composed of two colors (cyan, magenta) excluding yellow corresponding to $Y_0$ is extracted as the secondary color component. Moreover, at this time, the data with the second smaller value among the respective pieces of $C_0$, $M_0$ and $Y_0$ data is $M_0$ corresponding to magenta, the secondary color component value becomes the same value as that of $M_0$.

Furthermore, since the data with the maximum value among the respective pieces of the $C_0$, $M_0$ and $Y_0$ data is $C_0$, the primary color component extracted in the color separation unit 101*b* becomes $C_1$ indicating cyan, and a primary color component value thereof becomes the same value as that of $C_0$.

Next, in the γ correction unit 101*c*, the γ correction for the extracted primary to tertiary color components is performed. Note that, in the example shown in FIG. 25, a description is made only of the γ correction and the interpolation processing for $C_1$ as the primary color component, and a description of the γ correction and the interpolation processing for the other color components is omitted.

First, the γ correction is performed for the primary color component $C_1$ by using the relative gamma curve for C, and the output value $C_1$ (γC) is obtained. Moreover, the γ correction is performed for the primary color component $C_1$ by using the relative gamma curve for B, and the output value $C_1$ (γB) is obtained.

Then, in the interpolation processing unit 101*e*, the interpolation is performed between the output value $C_1$ (γC) and the output value $C_1$ (γB), which are obtained as described above. In this case, the above-mentioned expression (6) is applied, and by a ratio between ($C_1$-$B_1$) and $B_1$, the interpolation is performed between the output value $C_1$ (γC) and the output value $C_1$ (γB). As a result, $C_2$ is calculated as the corrected secondary color component.

Note that the secondary color components are not sometimes extracted as a result of extracting the respective color components by the color separation unit 101*b*. A description is made below of a procedure of the color adjustment in this case.

In an example shown in FIG. 26, in the color separation unit 101*b*, $Pb_1$ as the tertiary color component is extracted as mentioned above based on $C_0$, $M_0$ and $Y_0$, which are outputted from the input unit 101*a*.

Moreover, in the color separation unit 101*b*, the data with the second smallest value among the respective pieces of $C_0$, $M_0$ and $Y_0$ data is not present, and accordingly, the secondary color component is not extracted in this case.

Furthermore, since the data with the maximum value among the respective pieces of the $C_0$, $M_0$ and $Y_0$ data is $C_0$, the primary color component extracted in the color separation unit 101*b* becomes $C_1$ indicating cyan, and a primary color component value thereof becomes the same value as that of $C_0$.

Next, in the γ correction unit 101*c*, the γ correction for the extracted primary and tertiary color components is performed. Note that, in the example shown in FIG. 26, a description is made only of the γ correction and the interpolation processing for $C_1$ as the primary color component, and a description of the γ correction for the tertiary color component is omitted.

First, the γ correction is performed for the primary color component $C_1$ by using the relative gamma curve for C, and the output value $C_1$ (γC) is obtained. Moreover, in the example shown in FIG. 26, since the secondary color component is not present, the relative gamma curve for Pb is not used for the primary color component $C_1$, but each of the relative gamma curve for G and the relative gamma curve for B, which correspond to green and blue which are secondary colors including cyan, is used, whereby the γ correction is performed, and the output value $C_1$ (γG) and the output value $C_1$ (γB) are obtained.

Here, for the primary color component $C_1$, the relative gamma curve for Pb is not used, but the relative gamma curve for G and the relative gamma curve for B are individually used. This is for the purpose of ensuring gradation continuity. That is to say, in the case where $M_0$ becomes larger than $Y_0$ with respect to the example shown in FIG. 26, the relative gamma curve for B is used as the relative gamma curve for the secondary color, and on the contrary, in the case where $Y_0$ becomes larger than $M_0$, the relative gamma curve for G is used. Then, in the case where $M_0$ and $Y_0$ are equal to each other, when the relative gamma curve for Pb, which is different from these relative gamma curves, is used, then it is possible that discontinuity of the gradation, such as tone jump, may occur, and this is the reason for individually using the relative gamma curves for G and B. Note that, in the case where the secondary color component is not present, the γ correction may be performed for the primary color component by using the relative gamma curve for Pb.

Then, in the interpolation processing unit 101e, there is performed interpolation which is made by the output value $C_1$ (γC) obtained as described above, and by an average value between the output value $C_1$ (γG) and the output value $C_1$ (γB). In this case, weighting of the interpolation is determined by a ratio between $C_1$ and $Pb_1$. $C_2$ obtained by the above-mentioned interpolation is obtained by the following expression (11):

$$C_2 = [Pb_1 \cdot \{C_1(\gamma G) + C_1(\gamma B))/2\} + (C_1 - Pb_1) \cdot C_1(\gamma C)]/C_1 \quad (11)$$

Note that, in the case where the primary color component extracted in the color separation unit 101b is magenta, and the secondary color component is not present, then the relative gamma curve for M, the relative gamma curve for R and the relative gamma curve for B are individually used, whereby the γ correction is performed. Then, based on the obtained output values $M_1$ (γM), $M_1$ (γR) and $M_1$ (γB), $M_2$ is obtained by the following expression (12):

$$M_2 = [Pb_1 \cdot \{M_1(\gamma R) + M_1(\gamma B))/2\} + (M_1 - Pb_1) \cdot M_1(\gamma M)]/M_1 \quad (12)$$

Moreover, in the case where the primary color component extracted in the color separation unit 101b is yellow, and the secondary color component is not present, then the relative gamma curve for Y, the relative gamma curve for G and the relative gamma curve for R are individually used, whereby the γ correction is performed. Then, based on the obtained output values $Y_1$ (γY) (γG) and $Y_1$ (γR), $Y_2$ is obtained by the following expression (13):

$$Y_2 = [Pb_1 \cdot \{Y_1(\gamma G) + Y_1(\gamma R))/2\} + (Y_1 - Pb_1) \cdot Y_1(\gamma Y)]/Y_1 \quad (13)$$

In this embodiment, the above-mentioned interpolation processing is performed for the primary color components and the secondary color components; however, the interpolation processing does not have to be performed.

As shown in FIG. 22, the input image data subjected to the gamma correction as described above is inputted to the screen gamma correction unit 102, and is subjected to the screen gamma correction processing.

In the input image data inputted to the screen gamma correction unit 102, the screen gamma curve created as mentioned above is read out from the screen gamma curve storage unit 73, and is subjected to the screen gamma correction.

Then, the input image data subjected to the screen gamma correction is inputted to the screen processing unit 103, is subjected to predetermined screen processing, and is outputted as output image data indicating the respective gradation values of C, M, Y and K. That is to say, image data already subjected to the color adjustment is outputted.

Figure 27:
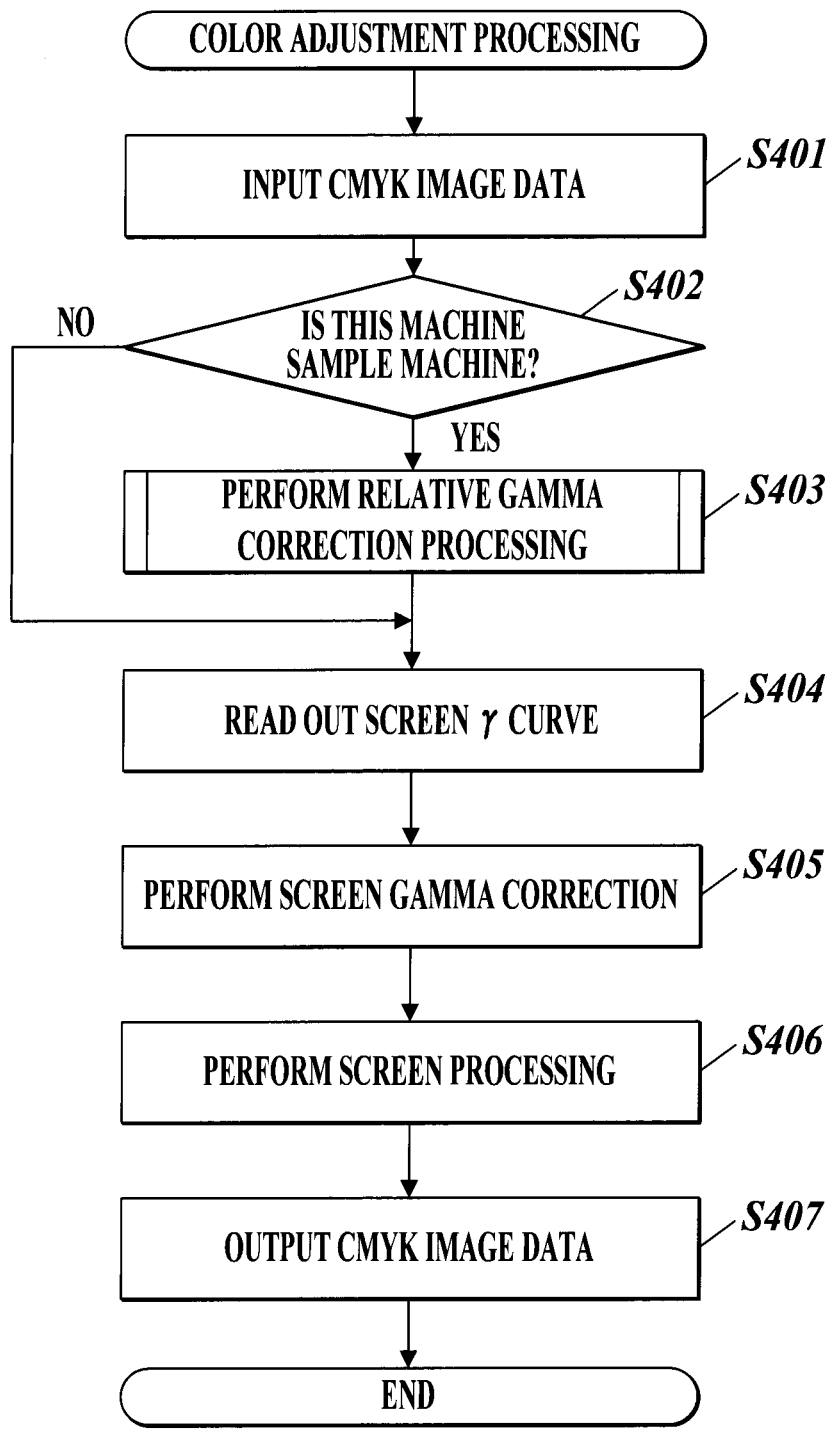
FIG. 27 is a flowchart explaining color adjustment processing.
Figure 28:
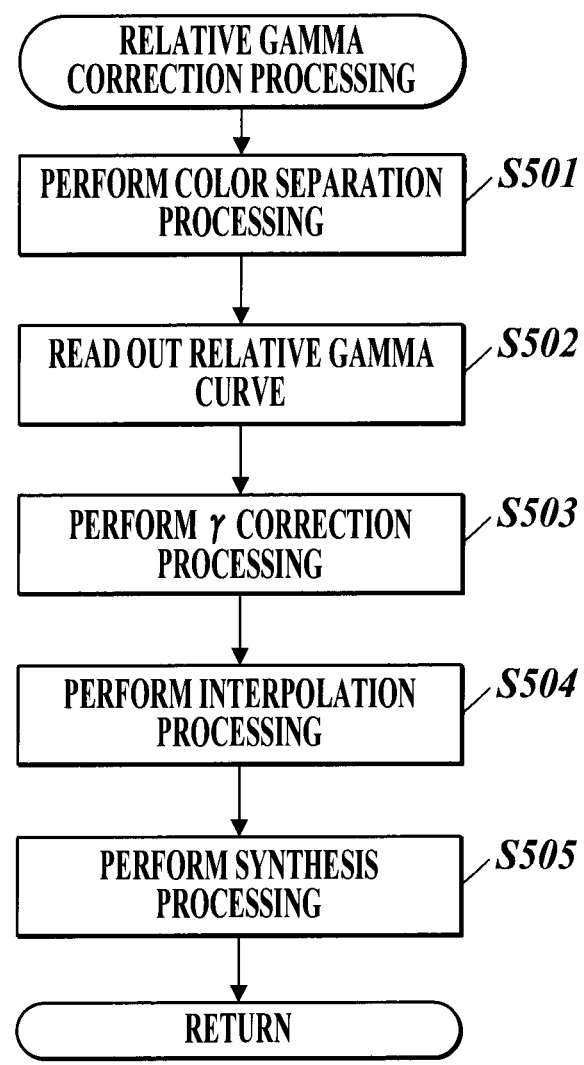
FIG. 28 is a flowchart explaining relative gamma correction processing.

A procedure of the color adjustment in each of the image forming apparatuses 100 configured as described above can be schematically represented by flowcharts shown in FIG. 27 and FIG. 28.

That is to say, as shown in FIG. 27, upon receiving the CMYK image data as the input image data at first (Step S401), the control unit 10 of each of the image forming apparatuses 100 determines whether or not the machine itself is the sample machine (Step S402). In the case of having determined that each image forming apparatus 100 (machine itself) is the sample machine (Step S402: Y), the control unit 10 thereof performs relative gamma correction processing by the relative gamma correction unit 101 (Step S403). Note that details of the relative gamma correction processing will be described later. Meanwhile, in the case of having not determined that the machine itself is the sample machine, that is, in the case of having determined that the machine itself is the target machine (Step S402: N), the control unit 10 of each image forming apparatus 100 does not implement the relative gamma correction processing, but executes process of Step S404.

In Step S404, the control unit 10 of each image forming apparatus 100 reads out the screen gamma curve from the screen gamma curve storage unit 73 (Step S404), and performs the screen gamma correction for the input image data by using the read out screen gamma curve (Step S405).

Then, the control unit 10 of each image forming apparatus 100 implements the screen processing for the input image data subjected to the screen gamma correction (Step S406), and thereafter, outputs, as output image data, the image data already subjected to the color adjustment.

Next, while referring to FIG. 28, a description is made of the relative gamma correction processing executed in Step S403.

First, by the color separation unit 101b, the control unit 10 of each image forming apparatus 100 extracts the primary color components, the secondary color components and the tertiary color component (Step S501).

Then, the control unit 10 of each image forming apparatus 100 reads out the relative gamma curves from the relative gamma curve storage unit 72 (Step S502), and by the γ correction unit 101c, performs the gamma correction, which uses the relative gamma curves, for the extracted primary color components, secondary color components and tertiary color component (Step S503).

Then, by the interpolation processing unit 101e, the control unit 10 of each image forming apparatus 100 performs the interpolation processing for the output values obtained by the γ correction (Step S504).

Then, by the synthesis unit 101f, the control unit 10 of each image forming apparatus 100 synthesizes the γ values for each of the interpolated color components, decides the respective gradation values of C, M and Y, and outputs, from the output unit 101g, the data indicating the respective gradation values of C, M, Y and K, which are subjected to the gamma correction (Step S505).

As described above, in the first embodiment, the gamma correction is performed by the interpolation between the corrected gradation values by the relative gamma curves of the primary colors (secondary colors) and the corrected gradation values by the relative gamma curves of the secondary colors (tertiary color). Accordingly, the occurrence of the tone jump is suppressed, and accuracy for stabilization of the image is enhanced.

Moreover, in the first embodiment, when only the color components of the secondary colors are not extracted from the input image data, the gradations indicating the color components of the extracted primary colors are individually corrected by using the relative gamma curves of all the secondary colors composing the primary colors concerned, the gradations concerned are averaged, and then the interpolation is performed between such an average value and the corrected gradation values by the relative gamma curves of the primary colors. Accordingly, the continuity of the gradations is ensured, and the accuracy for the color adjustment is enhanced.

Second Embodiment

Next, a description is made of a second embodiment of the present invention. In the first embodiment, one of the plural image forming apparatuses is defined as the target machine, the other image forming apparatuses are defined as the sample machines, and the color adjustment of the image data is performed in the sample machines so that the gradation characteristics of the sample machine can become the gradation characteristics of the target machine. In the second embodiment, an average of the gradation characteristics of the plural image forming apparatuses is obtained, the obtained average is defined as the gradation characteristics serving as the target, and the color adjustment of the image data is performed in the respective machines so that the gradation characteristics of the plural image forming apparatuses can become target gradation characteristics.

Note that the second embodiment of the present invention is similar to the first embodiment except that a procedure for obtaining the various pieces of information for implementing the color adjustment is different from that of the first embodiment, and accordingly, a description is made of a procedure according to the second embodiment, which is for obtaining the various pieces of information for implementing the color adjustment, and a description of other configurations is omitted.

Figure 29:
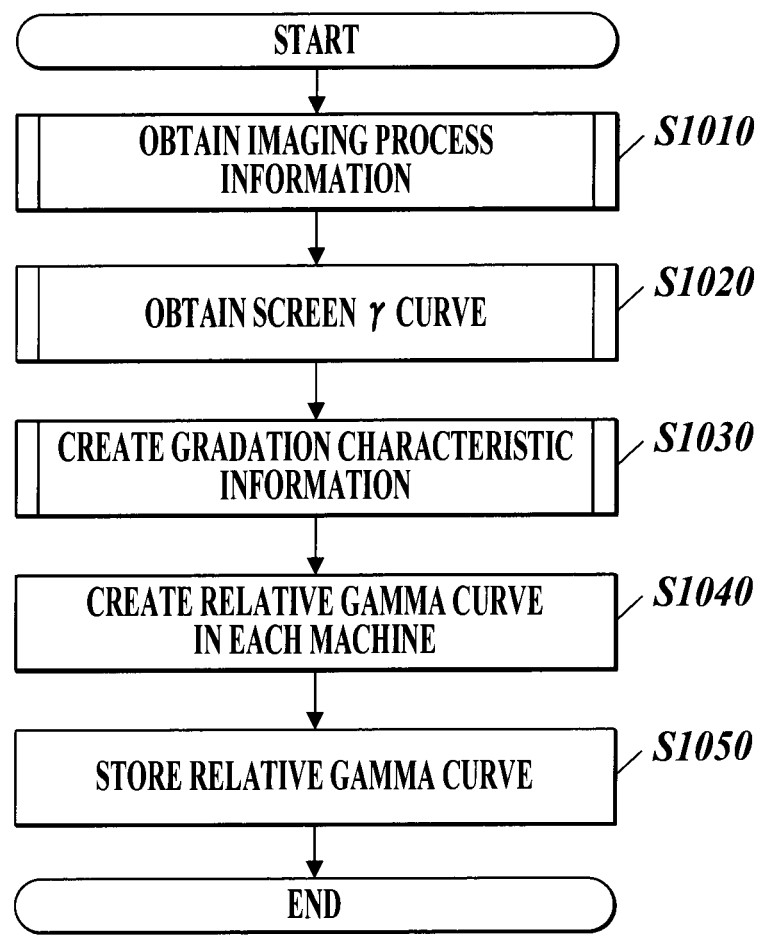
FIG. 29 is a schematic flowchart explaining a procedure for obtaining various pieces of information for implementing color adjustment in a second embodiment.

While referring to FIG. 29, a description is made of the procedure for obtaining the various pieces of information for implementing the color adjustment in the second embodiment.

Figure 30:
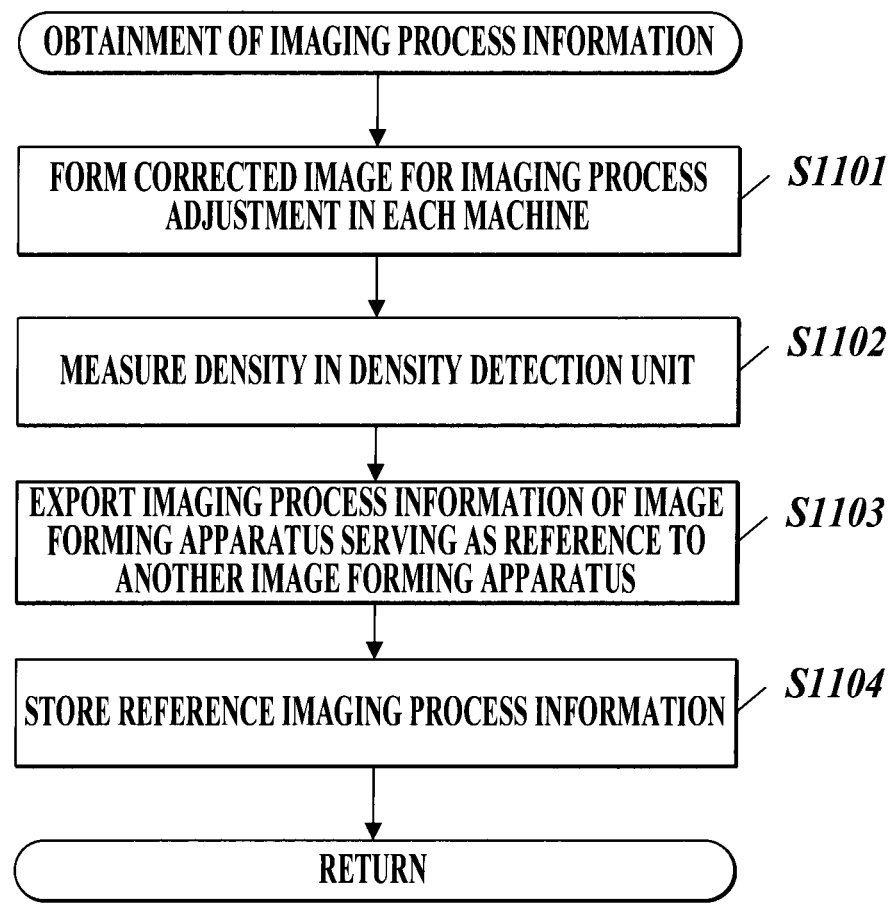
FIG. 30 is a flowchart explaining a procedure for obtaining imaging process information in the second embodiment.

First, in each of the plural image forming apparatuses 100, the imaging process information in which the characteristics of the imaging process are indicated is obtained (Step S1010). That is to say, each control unit 10 of the plural image forming apparatuses 100 obtains the characteristics of the imaging process. Then, the characteristics of the imaging process in one image forming apparatus selected from among the number (1) to number (n) image forming apparatuses 100 are defined as characteristics of the imaging process, which serve as a reference, and the control unit 10 of the image forming apparatus 100, which obtains the characteristics of the imaging process, the characteristics serving as the reference, exports imaging process information, in which the characteristics of the imaging process created in the machine itself are indicated, to the other image forming apparatuses 100. The other image forming apparatuses 100 individually store and hold the exported imaging process information. Here, while referring to FIG. 30, a description is made of a procedure for obtaining the imaging process information.

First, the control unit 10 of each of the number (1) to number (n) image forming apparatuses 100 forms the corrected image for the imaging process adjustment in the procedure mentioned above in the first embodiment (Step S1101), and performs the density measurement by the density detection unit 60 (Step S1102).

Next, the density measurement values of the respective colors of one arbitrary image forming apparatus 100 among the respective image forming apparatuses 100, the density measurement values being obtained as mentioned above, are defined as the characteristics of the imaging process, which serve as the reference. The control unit 10 of the image forming apparatus 100, which obtains the characteristics of the imaging process, the characteristics serving as the reference, exports, to the other image forming apparatuses 100, the imaging process information indicating the characteristics of the imaging process concerned (Step S1103). Note that the image forming apparatus 100 taken as a reference may be a predetermined one or a selectable one every time of implementing the processing concerned.

Then, each of the plural image forming apparatuses 100 other than the image forming apparatus taken as the reference individually stores, in the storage unit 70, the imaging process information of the image forming apparatus taken as the reference and the imaging process information obtained in the machine itself (Step S1104).

Figure 31:
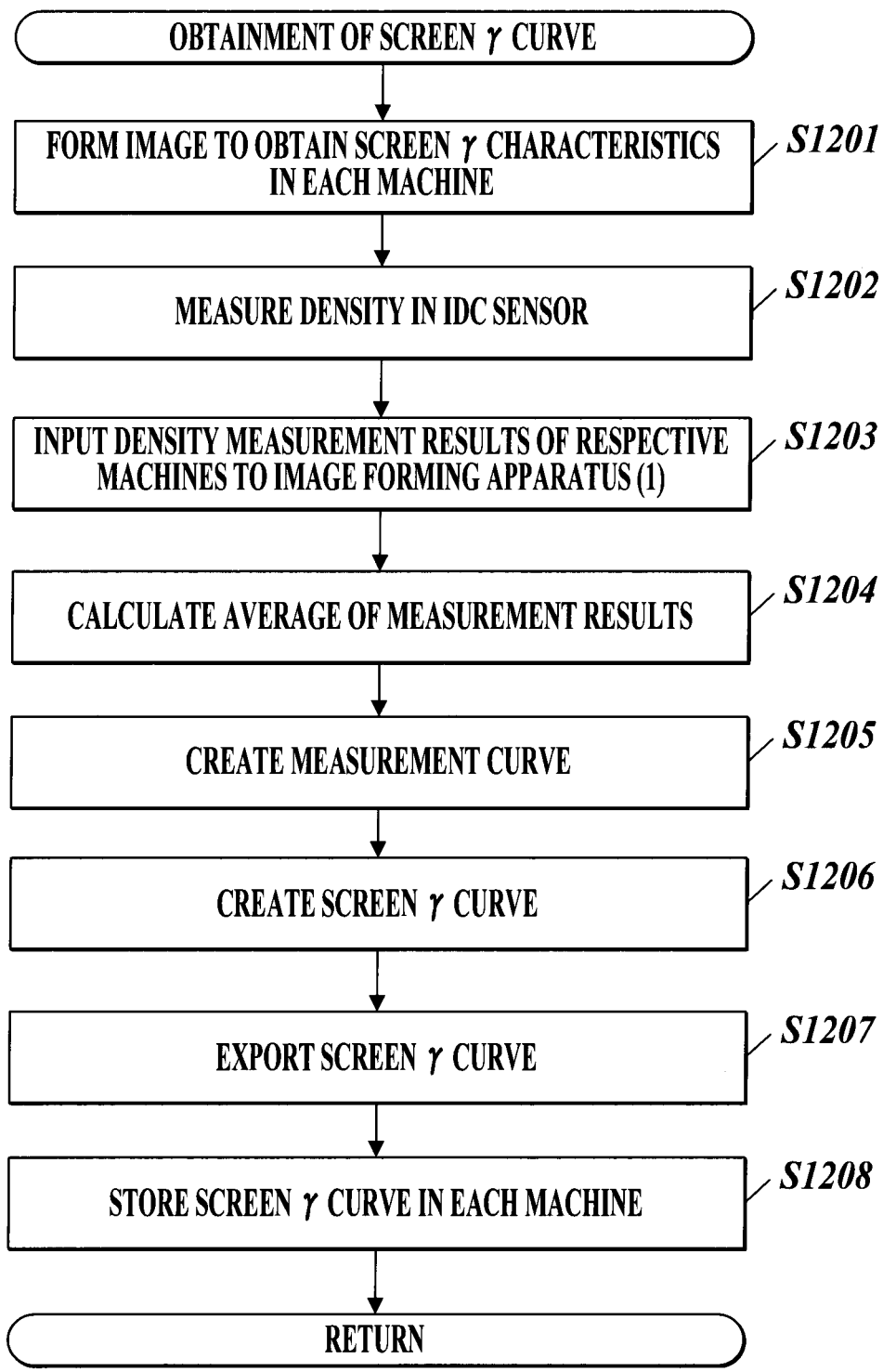
FIG. 31 is a flowchart explaining a procedure for obtaining a screen gamma curve in the second embodiment.

When the imaging process information is obtained in each of the image forming apparatuses 100 in such a manner as described above, then as shown in FIG. 29, the screen gamma curve is obtained in each of the plural image forming apparatuses 100 (Step S1020). That is to say, in the imaging forming unit 40, the control unit 10 of each of the number (1) to number (n) image forming apparatuses 100 outputs plural screen images different in gradation, and in the IDC sensor 90, measures the density of the screen image for each of the colors. Then, for each of the gradations, the control unit 10 calculates an average of the densities of the screen image, which are measured in each of the image forming apparatuses 100. In this embodiment, the average of the densities is calculated in the number (1) image forming apparatus 100. Here, the image forming apparatus 100 that calculates the average of the densities may be any of the number (1) to the number (n). Moreover, not the image forming apparatus 100 but, for example, an external apparatus such as the PC 1000 may calculate the average of the densities. Then, based on the average of the densities of the screen image, which is calculated as mentioned above, the control unit 10 of the number (1) image forming apparatus 100 creates a screen gamma curve in a similar procedure to that mentioned in the first embodiment. The control unit 10 of the number (1) image forming apparatus 100 exports the created screen gamma curve to the other image forming apparatuses 100. Each of the number (2) to number (n) image forming apparatuses 100 stores and holds the exported screen gamma curve. Here, while referring to FIG. 31, a description is made in detail of a procedure for obtaining the screen gamma curve.

First, in each of the number (1) to number (n) image forming apparatuses 100, the image for obtaining the screen gamma characteristics is obtained (Step S1201). Specifically, the image forming unit 40 of each of the number (1) to number (n) image forming apparatuses 100 forms such a screen gamma characteristic obtaining image on the intermediate transfer belt 43 in the procedure mentioned above in the first embodiment.

Then, in the IDC sensor 90, the control unit 10 of each of the image forming apparatuses 100 captures the screen gamma characteristic obtaining image formed on the intermediate transfer belt 43, and measures the density of each screen image (Step S1202).

Next, the control unit 10 of each of the image forming apparatuses 100 creates, for each color, a measurement result of the density of each screen image, which is measured as mentioned above, and then transmits the created measurement result to the number (1) image forming apparatus 100 (Step S1203).

Upon receiving the measurement result of the density of each screen image from each of the image forming apparatuses 100, the control unit 10 of the number (1) image forming apparatus 100 calculates, for each color, the average of those densities of the respective screen images (Step S1204).

Then, based on such averages of the densities of the screen images, which is calculated as mentioned above, the control unit 10 of the number (1) image forming apparatus 100 plots averages of the output density values with respect to the input gradations, and creates a measurement curve that is based on points thus plotted (Step S1205). Note that a creation procedure of the measurement curve is similar to that mentioned above in the first embodiment, and accordingly, a detailed description thereof is omitted.

Then, based on the measurement curve obtained as mentioned above, the control unit 10 of the number (1) image forming apparatus 100 creates a screen gamma curve in a similar procedure to that mentioned above in the first embodiment (Step S1206).

The control unit 10 of the number (1) image forming apparatus 100 exports the created screen gamma curve to each of the number (2) to number (n) image forming apparatuses 100 (Step S1207).

Then, each of the number (1) to number (n) image forming apparatuses 100 stores the screen gamma in the screen gamma curve storage unit 73 of the storage unit 70 (Step S1208).

In such a way, in a similar way to the first embodiment, in the plural image forming apparatuses 100, the screen gamma curve common thereto is individually stored.

Note that, in this embodiment, the measurement values of the densities of the respective screen images are obtained in the respective image forming apparatuses, and in one image forming apparatus, the averages of the measurement values are calculated, and the measurement curve is created based on the calculated averages. However, such a procedure may be adopted, in which the measurement curves are created in the respective image forming apparatuses, and in one image forming apparatus, an average of the measurement curves created in the respective image forming apparatuses is obtained.

Figure 32:
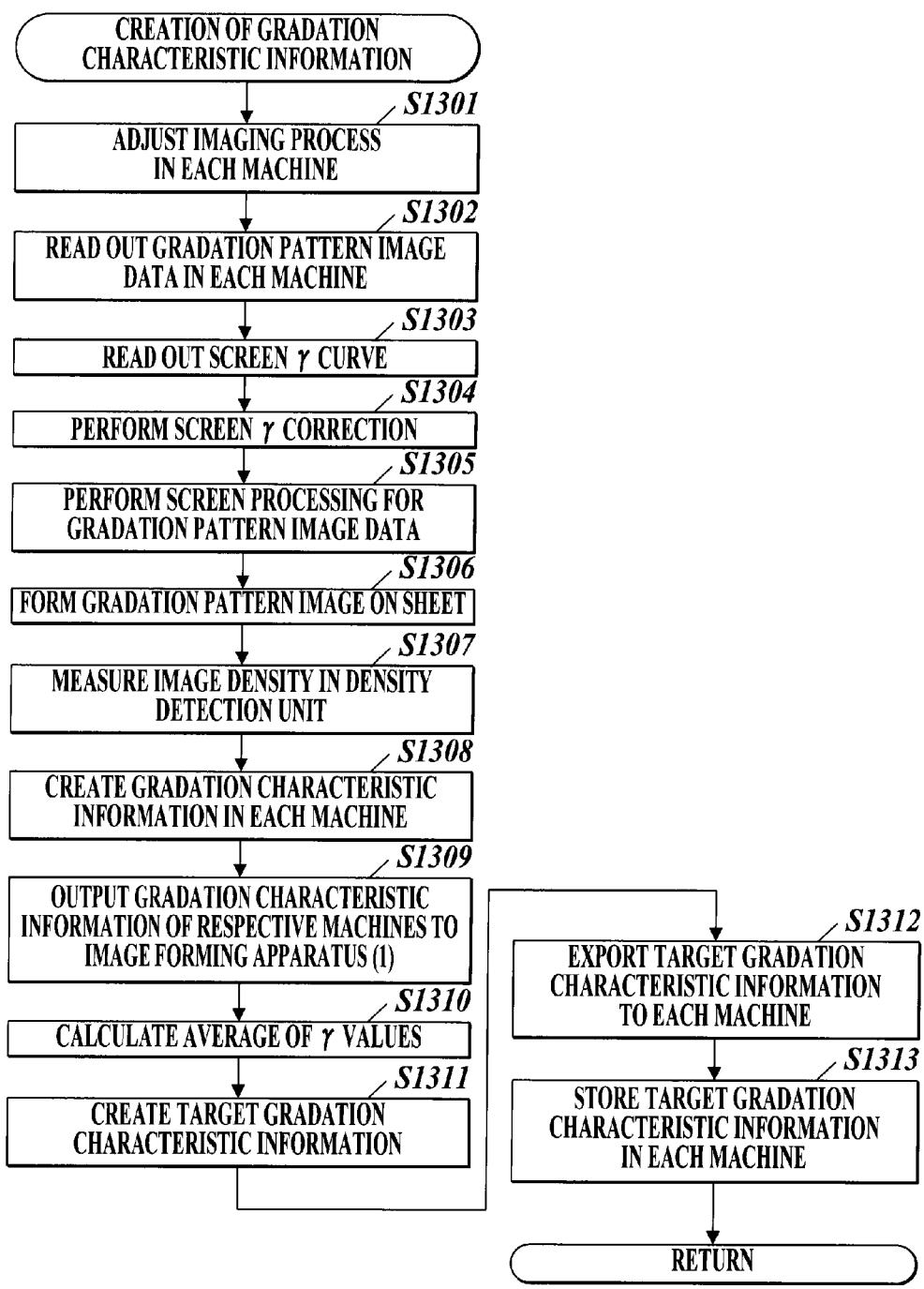
FIG. 32 is a flowchart explaining a procedure for creating gradation characteristic information in the second embodiment.

When the screen gamma curve is obtained in each machine as mentioned above, then as shown in FIG. 29, gradation characteristic information in each of the plural image forming apparatuses 100 is created (Step S1030). That is to say, in each of the plural image forming apparatuses 100, the gradation characteristic information is created in the procedure mentioned above in the first embodiment. Then, in the second embodiment, the average of the γ values in the gradation characteristic information created individually in the respective image forming apparatuses 100 is calculated for each gradation, and this is defined as the target gradation characteristic information, and is then stored and held individually in the respective image forming apparatuses 100. In this embodiment, the target gradation characteristic information is created in the number (1) image forming apparatus 100. Here, the image forming apparatus 100 that creates the target gradation characteristic information may be any of the number (1) to the number (n). Moreover, not the image forming apparatus 100 but, for example, an external apparatus such as the PC 1000 may create the target gradation characteristic information. While referring to FIG. 32, a description is made below in detail of the procedure for creating the gradation characteristic information.

First, in each of the number (1) to number (n) image forming apparatuses 100, the adjustment of the imaging process is performed (Step S1301). Specifically, the control unit 10 of each of the image forming apparatuses 100 reads out, from the storage unit 70, density information as the imaging process information exported from the image forming apparatus 100 taken as the reference as mentioned above, and density information as the imaging process information of the machine itself. Then, the control unit 10 of each of the image forming apparatuses 100 calculates differences in density from the density information as the reference and the density information of the machine itself. Then, the control unit 10 of each of the image forming apparatuses 100 implements the adjustment of the imaging process in the procedure mentioned above in the first embodiment.

Next, each control unit 10 of the number (1) to number (n) image forming apparatuses 100 reads out gradation pattern image data stored in the gradation pattern image storage unit 71 of the storage unit 70 (Step S1302).

When the gradation pattern image data is read out, each control unit 10 of the number (1) to number (n) image forming apparatuses 100 reads out the screen gamma curve (Step S1303), and performs screen gamma correction therefor (Step S1304).

Then, each control unit 10 of the number (1) to number (n) image forming apparatuses 100 performs screen processing for the gradation pattern image data subjected to the screen gamma correction (Step S1305).

Then, in the image forming unit 40, each control unit 10 of the number (1) to number (n) image forming apparatuses 100 forms the gradation pattern image on the sheet based on the gradation pattern image data subjected to the screen processing (Step S1306).

Next, each control unit 10 of the number (1) to number (n) image forming apparatuses 100 performs density measurement for the respective patches in the gradation pattern image formed on the sheet in the procedure mentioned above in the first embodiment (Step S1307).

Then, based on the γ value for each gradation of each color, which is obtained as described above, each control unit 10 of the number (1) to number (n) image forming apparatuses 100 creates gradation characteristic information (Step S1308).

Next, each control unit 10 of the number (2) to number (n) image forming apparatuses 100 outputs the gradation characteristic information, which is created as described above, to the number (1) image forming apparatus 100 (Step S1309).

Then, based on the received gradation characteristic information of each machine, the control unit 10 of the number (1) image forming apparatus 100 calculates averages of the γ values, each γ value belonging to each gradation of each color (Step S1310), and based on this, creates gradation characteristic information taken as a target (Step S1311). That is to say, in the second embodiment, the gradation characteristic information is obtained from such averages of the γ values, each γ value belonging to each gradation of each color and being obtained in each of the plural image forming apparatuses 100, and defines this gradation characteristic information as target gradation characteristic information.

Then, the control unit 10 of the number (1) image forming apparatus 100 exports the target gradation characteristic information, which is obtained as mentioned above, to each of the number (2) to number (n) image forming apparatuses 100 (Step S1312).

Then, each control unit 10 of the number (1) to number (n) image forming apparatuses 100 stores the target gradation information in the target gradation characteristic storage unit 74 (Step S1313).

When the gradation characteristic information is obtained in each of the machines in such a manner as described above, then as shown in FIG. 29, each control unit 10 of the number (1) to number (n) image forming apparatuses 100 creates the relative gamma curve in the procedure mentioned above in the first embodiment (Step S1040), and stores the relative gamma curve in the relative gamma curve storage unit 72 (Step S1050).

When each of the number (1) to number (n) image forming apparatuses 100 obtains the relative gamma curve and the screen gamma curve in such a manner as described above, each of the number (1) to number (n) image forming apparatuses 100 implements the color adjustment in a similar way to the first embodiment.

As described above, also in the second embodiment, the gamma correction is performed by the interpolation between the corrected gradation values by the relative gamma curves of the primary colors (secondary colors) and the corrected gradation values by the relative gamma curves of the secondary colors (tertiary color). Accordingly, the occurrence of the tone jump is suppressed, and the accuracy for the stabilization of the image is enhanced.

Moreover, also in the second embodiment, when only the color components of the secondary colors are not extracted from the input image data, the gradations indicating the color components of the extracted primary colors are individually corrected by using the relative gamma curves of all the secondary colors composing the primary colors concerned, the gradations concerned are averaged, and then the interpolation is performed between such an average value and the corrected gradation values by the relative gamma curves of the primary colors. Accordingly, the continuity of the gradations is ensured, and the accuracy for the color adjustment is enhanced.

As described above, in accordance with the first embodiment of the present invention, the plural image forming apparatuses 100 include: the number (1) image forming apparatus 100 as the target machine; and the number (2) to number (n) image forming apparatuses 100 as the sample machines. Each of the image forming apparatuses 100 includes: the image forming unit 40 that mixes n pieces of the coloring materials with one another to form the image on the sheet, and in addition, forms, on the sheet, the gradation pattern image including the patches of the gradations different for each of the colors ranging from the primary color composed of one color among the n pieces of the coloring materials to the n-ary color composed of n colors among the n pieces of the coloring materials; the density detection unit 60 that detects the densities of the respective patches included in the gradation pattern image formed on the sheet; and the control unit 10 that obtains the gradation characteristics from the densities of the respective patches, which are detected by the density detection unit 60. Then, the control units 10 of the number (2) to number (n) image forming apparatuses 100 as the sample machines receive the gradation characteristics of the respective patches of the number (1) image forming apparatus 100 as the target machine. Then, the control units 10 of the number (2) to number (n) image forming apparatuses 100 as the sample machines associate the gradation characteristics, which are obtained by the control units 10 of the number (2) to number (n) image forming apparatuses 100 as the sample machines concerned, with the gradation characteristics of the respective patches in the number (1) image forming apparatus 100 as the target machine. Then, each of the control units 10 of the number (2) to number (n) image forming apparatuses 100 as the sample machines creates the relative gamma curve corresponding to the respective colors from the primary color to the n-ary color, the relative gamma curve serving for correcting the gradation of the received image data so as to obtain the densities indicated by the gradation characteristics of the respective patches in the number (1) image forming apparatus 100 as the target machine. Then, each control unit 10 of the number (2) to number (n) image forming apparatuses 100 as the sample machines extracts, from the received image data, the respective color components from the primary color to the n-ary color. Then, each control unit 10 of the number (2) to number (n) image forming apparatuses 100 as the sample machines decides the output values in the respective color components based on the relative gamma table. Then, each control unit 10 of the number (2) to number (n) image forming apparatuses 100 as the sample machines synthesizes the decided output values ranging from the primary color to the n-ary color, and creates the output image data. Then, in the image forming unit 40, each control unit 10 of the number (2) to number (n) image forming apparatuses 100 as the sample machines forms the image on the sheet based on the created output image data. As a result, such color adjustment that can obtain similar output results in the entire system that composes the plurality of image forming apparatuses can be implemented. Accordingly, variations in the output results among the image forming apparatuses are reduced. Moreover, work that requires a long time and a large work load, such as performing the color adjustment work by recreating a color profile, is not required, and the image can be stabilized in an ideal state by a simple method. Moreover, the color adjustment in which the secondary colors and the tertiary color are taken into consideration is performed, and accordingly, the image can be stabilized in a more ideal state.

Moreover, in accordance with the first embodiment of the present invention, the IDC sensor 90 of the number (1) image forming apparatus 100 as the target machine captures densities of a screen patch with plural gradations made by the primary colors. Then, the control unit 10 of the number (1) image forming apparatus 100 as the target machine allows the image forming unit 40 to output the screen patch, and in addition, obtains the measurement curve from the respective densities of the screen patch with the plural gradations, which is captured by the IDC sensor 90. Then, the control unit 10 of the number (1) image forming apparatus 100 as the target machine creates the screen gamma curve based on the measurement curve. Then, each of the image forming units 40 of the number (1) to number (n) image forming apparatuses 100 forms the gradation pattern image on the sheet by using the screen gamma curve created by the control unit 10 of the number (1) image forming apparatus 100 as the target machine. As a result, compression of the correction amount in the gamma correction by the relative gamma curve can be achieved, and accordingly, it becomes possible to implement effective relative gamma correction more easily. Moreover, the screen gamma curve created in one image forming apparatus is shared, and accordingly, processing for creating the screen gamma curve can be simplified.

Moreover, in accordance with the second embodiment of the present invention, each of the number (1) to number (n) image forming apparatuses 100 includes: the image forming unit 40 that mixes n pieces of the coloring materials with one another to form the image on the sheet, and in addition, forms, on the sheet, the gradation pattern image including the patches of the gradations different for each of the colors ranging from the primary color composed of one color among the n pieces of the coloring materials to the n-ary color among the n pieces of the coloring materials; the density detection unit 60 that detects the densities of the respective patches included in the gradation pattern image formed on the sheet; and the control unit 10 that obtains the gradation characteristics from the densities of the respective patches, which are detected by the density detection unit 60. Then, the control unit 10 of the number (1) image forming apparatus 100 calculates the average in the gradation characteristics among the number (1) to number (n) image forming apparatuses 100 from the gradation characteristics for each of the number (1) to number (n) image forming apparatuses 100, which are obtained individually in the image forming apparatuses 100 concerned. In such a way, the control unit 10 of the number (1) image forming apparatus 100 obtains the average gradation characteristics. Then, each control unit 10 of the number (1) to number (n) image forming apparatuses 100 receives the average gradation characteristics obtained by the control unit 10 of the number (1) image forming apparatus 100. Then, each of the control units 10 of the number (1) to number (n) image forming apparatuses 100 associates the obtained gradation characteristics with the average gradation characteristics, and creates the relative gamma curve corresponding to the respective colors from the primary color to the n-ary color, the relative gamma curve serving for correcting the gradation of the received image data so as to obtain the densities indicated by the average gradation characteristics. Then, each control unit 10 of the number (1) to number (n) image forming apparatuses 100 extracts, from the received image data, the respective color components from the primary color to the n-ary color. Then, each control unit 10 of the number (1) to number (n) image forming apparatuses 100 decides the output values in the respective color components based on the relative gamma table. Then, each control unit 10 of the number (1) to number (n) image forming apparatuses 100 synthesizes the decided output values ranging from the primary color to the n-ary color, and creates the output image data. Then, based on the created output image data, each control unit 10 of the number (1) to number (n) image forming apparatuses 100 allows the image forming unit 40 to form the image on the sheet. As a result, such color adjustment that can obtain similar output results in the entire system that composes the plurality of image forming apparatuses can be implemented. Accordingly, variations in the output results among the image forming apparatuses are reduced. Moreover, work that requires a long time and a large work load, such as performing the color adjustment work by recreating a color profile, is not required, and the image can be stabilized in an ideal state by a simple method. Moreover, the color adjustment in which the secondary colors and the tertiary color are taken into consideration is performed, and accordingly, the image can be stabilized in a more ideal state.

Moreover, in accordance with the second embodiment of the present invention, each IDC sensor 90 of the number (1) to number (n) image forming apparatuses 100 captures densities of a screen patch with plural gradations made by the primary colors. Then, each control unit 10 of the number (1) to number (n) image forming apparatuses 100 allows the image forming unit 40 to output the screen patch, and in addition, obtains the respective densities of the screen patch with the plural gradations, which is captured by the IDC sensor 90. Then, the control unit 10 of the number (1) image forming apparatus 100 calculates the average of the respective densities of the screen patches with the plural gradations among the number (1) to number (n) image forming apparatuses 100 from the respective densities of the screen patches with the plural gradations for each of the number (1) to number (n) image forming apparatuses 100, which are obtained individually in the image forming apparatuses 100 concerned. In such a way, the control unit 10 of the number (1) image forming apparatus 100 obtains the average measurement curve. Then, the control unit 10 of the number (1) image forming apparatus 100 creates the screen gamma curve based on the obtained measurement curve. Then, each image forming unit 40 of the number (1) to number (n) image forming apparatuses 100 applies the screen gamma curve created by the control unit 10 of the number (1) image forming apparatus 100, and forms the gradation pattern image on the sheet. As a result, compression of the correction amount in the gamma correction by the relative gamma curve can be achieved, and accordingly, it becomes possible to implement effective relative gamma correction more easily. Moreover, the screen gamma curve created in one image forming apparatus is shared, and accordingly, processing for creating the screen gamma curve can be simplified.

Moreover, in accordance with each of the first and second embodiments of the present invention, each control unit 10 of the number (1) to number (n) image forming apparatuses 100 allows the image forming unit 40 to form the maximum gradation patches with the maximum gradations in the primary colors. Then, each control unit 10 of the number (1) to number (n) image forming apparatuses 100 obtains imaging process characteristics specified from the densities of the maximum gradation patches, and in addition, receives imaging process characteristics obtained by the control units 10 of the other image forming apparatuses 100. Then, each control unit 10 of the number (1) to number (n) image forming apparatuses 100 changes setting of the imaging process in the image forming unit 40 so that the densities in the maximum gradations in the primary colors, which are indicated by the imaging process characteristics of the machine itself, can become the densities in the maximum gradations in the primary colors, which are indicated by the imaging process characteristics of the other image forming apparatuses 100. As a result, the densities in the maximum gradations, for which it is difficult to make matching in terms of the image processing, can be matched among the plurality of image forming apparatuses, and accordingly, variations in the output results among the image forming apparatuses are reduced.

Moreover, in accordance with each of the first and second embodiments of the present invention, each image forming unit 40 of the number (1) to number (n) image forming apparatuses 100 includes: the photosensitive drums 41Y, 41M, 41C and 41K, which carry the toner images; the LDs 404Ya, 404Ma, 404Ca and 404Ka for exposing the photosensitive drums 41Y, 41M, 41C and 41K and forming the electrostatic latent images therein; and the developing units 41Ya, 41Ma, 41Ca and 41Ka, which develop the formed electrostatic latent images by developers. Then, each control unit 10 of the number (1) to number (n) image forming apparatuses 100 changes output amounts the LDs 404Ya, 404Ma, 404Ca and 404Ka, and changes the setting of the imaging process. As a result, the setting of the imaging process can be changed by a simple method.

Moreover, in accordance with each of the first and second embodiments of the present invention, each image forming unit 40 of the number (1) to number (n) image forming apparatuses 100 includes: the photosensitive drums 41Y, 41M, 41C and 41K, which carry the toner images; the chargers 403Y, 403M, 403C and 403K, which charge the photosensitive drums 41Y, 41M, 41C and 41K; the LDs 404Ya, 404Ma, 404Ca and 404Ka for exposing the photosensitive drums 41Y, 41M, 41C and 41K and forming the electrostatic latent images therein; and the developing units 41Ya, 41Ma, 41Ca and 41Ka, which develop the formed electrostatic latent images by developers. Then, each control unit 10 of the number (1) to number (n) image forming apparatuses 100 changes the charging voltages for the photosensitive drums 41Y, 41M, 41C and 41K in the chargers 403Y, 403M, 403C and 403K, and changes the setting of the imaging process. As a result, the setting of the imaging process can be changed by a simple method.

Moreover, in accordance with each of the first and second embodiments of the present invention, each density detection unit 60 of the number (1) to number (n) image forming apparatuses 100 irradiates light onto the respective patches, detects light reflected by the respective patches, and detects the densities of the respective patches. Then, each density detection unit 60 of the number (1) to number (n) image forming apparatuses 100 outputs, to the control unit 10, an image density signal including the respective signal components of R, G and B, which are obtained by receiving the reflected light from the respective patches. Then, with regard to the patch of the secondary or more colors, each control unit 10 of the number (1) to number (n) image forming apparatuses 100 extracts, from the image density signal, the luminance signal (Y) as a component indicating brightness. Then, each control unit 10 of the number (1) to number (n) image forming apparatuses 100 obtains the gradation characteristics based on the extracted luminance signal (Y). As a result, a gamma curve with high accuracy of the color adjustment can be obtained.

Moreover, in accordance with each of the first and second embodiments of the present invention, three-color toner materials of cyan, magenta and yellow are used as the n pieces of the coloring materials. Accordingly, highly accurate color adjustment can be performed in the image forming apparatus of the electrophotographic mode.

Note that the description in the embodiments of the present invention merely illustrates an example of the image forming system according to the present invention, and the present invention is not limited to this. It is also possible to appropriately change detailed configurations and detailed operations of the respective functional units which compose the image forming system.

Moreover, in each embodiment of the present invention, the screen gamma correction by the screen gamma curve is performed; however, the screen gamma correction does not have to be performed.

Moreover, in each embodiment of the present invention, the adjustment of the imaging process is performed in each of the image forming apparatuses so that the densities in the maximum gradations in the primary colors can be matched among the respective image forming apparatuses; however, the adjustment of the imaging process does not have to be performed.

Moreover, in each embodiment of the present invention, the color adjustment for the respective colors ranging from the primary colors to the tertiary color is performed by three colors of cyan, magenta and yellow; however, with regard to the coloring materials for use, two colors or four or more colors are also applicable.

Moreover, in each embodiment of the present invention, the densities of the patches of the secondary or more colors are specified by extracting the luminance signals from the image density signal; however, the densities of the patches of the secondary or more colors may be specified by other methods.

Moreover, in each embodiment of the present invention, the export of the various pieces of information is performed online; however, the export of the various pieces of information may be performed offline, for example, by using a portable recording medium such as a universal serial bus (USB) memory and a compact disk-recordable (CD-R).

Moreover, in the first embodiment, the number (1) image forming apparatus 100 is defined as the target machine; however, it is needless to say that any of the number (2) to number (n) image forming apparatuses 100 may be defined.

Moreover, in each of the image forming apparatuses, advance calibration may be performed so that characteristics such as gradation characteristics at the time of shipment thereof can be predetermined gradation characteristics.

Moreover, in the second embodiment, based on the gradation characteristic information of all the image forming apparatuses for use, the average of the γ values for each gradation of each color is calculated, and based on this, the target gradation characteristic information is created. However, based on gradation characteristic information of a part of the image forming apparatuses for use, the average of the γ values for each gradation of each color may be calculated, and based on this, the target gradation characteristic information may be created.

Moreover, in the second embodiment, from the measurement results of the densities of the respective screen images of all the image forming apparatuses for use, the averages of the densities of the respective screen images are calculated, and based on the calculated averages, the screen gamma curve is created. However, from measurement results of densities of the respective screen images of a part of the image forming apparatuses for use, the averages of the densities of the respective screen images may be calculated, and based on the calculated averages, the screen gamma curve may be created.

Moreover, in each embodiment of the present invention, there is disclosed the example of using the hard disk, the semiconductor nonvolatile memory and the like as a computer-readable medium for the programs according to the present invention; however, the present invention is not limited to this. As other computer-readable mediums, a portable recording medium such as CD-ROM is applicable. Moreover, a carrier wave is also applied as a medium that provides data of the programs according to the present invention through a communication line.

What is claimed is:

1. A color adjustment method for performing color adjustment for each of plural image forming apparatuses, the color adjustment method comprising:
   a gradation pattern creation step of, in each of the plural image forming apparatuses, forming, on a sheet, a gradation pattern image including patches different in gradation for each of colors in n (n is a positive integer) pieces of coloring materials, the colors ranging from a primary color composed of one color to an n-ary color composed of n colors in the n pieces of coloring materials;
   a density detection step of detecting densities of the respective patches included in the gradation pattern image formed on the sheet, and obtaining density information for each of the image forming apparatuses;

a gamma curve creation step of, among the density information of the respective patches for each of the image forming apparatuses, the density information being obtained in the density detection step, associating the density information of the respective patches in a second image forming apparatus other than a first image forming apparatus serving as a reference with the density information of the respective patches in the first image forming apparatus, and then creating, for each of the image forming apparatuses, a gamma curve corresponding to each of the respective colors ranging from the primary color to the n-ary color, the gamma curve serving for correcting a gradation of received image data, so as to obtain densities indicated by the density information of the respective patches in the first image forming apparatus; and a color adjustment step of extracting respective color components ranging from the primary color to the n-ary color from the image data inputted to the second image forming apparatus, deciding output values in each of the respective color components based on the gamma curve corresponding to the second image forming apparatus that has received the image data, creating output image data by synthesizing the decided output values of the primary color to the n-ary color with one another, and forming an image on the sheet in the second image forming apparatus based on the created output image data.

2. The color adjustment method of claim 1, further comprising:

a screen gradation correction curve creation step of outputting, by the first image forming apparatus, a screen patch of plural gradations by the primary color, and creating in advance a screen gradation correction curve based on screen gradation characteristics obtained by individually capturing densities of the screen patch, wherein, in the gradation pattern creation step, the gradation pattern image is formed on the sheet by applying the screen gradation correction curve for each of the plural image forming apparatuses.

3. A color adjustment method for performing color adjustment for each of plural image forming apparatuses, the color adjustment method comprising:

a gradation pattern creation step of, in each of the plural image forming apparatuses, forming, on a sheet, gradation pattern image including patches different in gradation for each of colors in n (n is a positive integer) pieces of coloring materials, the colors ranging from a primary color composed of one color to an n-ary color composed of n colors in the n pieces of coloring materials;

a density detection step of detecting densities of the respective patches included in the gradation pattern image formed on the sheet, and obtaining density information for each of the image forming apparatuses;

an average density information obtaining step of calculating an average of the density information of the respective patches for each of the image forming apparatuses, the density information being obtained in the density detection step, and then obtaining average density information;

a gamma curve creation step of associating the density information of the respective patches for each of the plural image forming apparatuses, the density information being obtained in the density detection step, with the average density information individually obtained in the average density information obtaining step, and then creating, for each of the image forming apparatuses, a gamma curve corresponding to each of the respective colors ranging from the primary color to the n-ary color, the gamma curve serving for correcting a gradation of received image data, so as to obtain a density indicated by the average density information; and a color adjustment step of extracting respective color components ranging from the primary color to the n-ary color from the image data inputted to any of the plural image forming apparatuses, deciding output values in each of the respective color components based on the gamma curve corresponding to the image forming apparatus that has received the image data, creating output image data by synthesizing the decided output values of the primary color to the n-ary color with one another, and forming an image on the sheet in the image forming apparatus based on the created output image data.

4. The color adjustment method of claim 3, further comprising:

a screen gradation correction curve creation step of outputting, in each of the plural image forming apparatuses, a screen patch of plural gradations by the primary color, obtaining respective densities of the screen patch of the plural gradations, obtaining average screen gradation characteristics by calculating averages of the respective densities of the screen patches of the plural gradations among the plural image forming apparatuses from the respective densities of the screen patches of the plural gradations, the densities being obtained in each of the plural image forming apparatuses, and creating in advance a screen gradation correction curve based on the obtained average screen gradation characteristics, wherein, in the gradation pattern creation step, the gradation pattern image is formed on the sheet by applying the screen gradation correction curve for each of the plural image forming apparatuses.

5. The color adjustment method of claim 1, further comprising:

a maximum density measurement step of measuring each density at a maximum gradation in the primary color in the plural image forming apparatuses; and an imaging process setting step of selecting a specific image forming apparatus among the plural image forming apparatuses, and changing setting of an imaging process in each of the plural image forming apparatuses so that the densities at the maximum gradation in the primary color in the image forming apparatuses other than the selected specific image forming apparatus are to be the density at the maximum gradation in the primary color in the selected specific image forming apparatus, wherein the maximum density measurement step and the imaging process setting step are implemented in advance before implementing the gradation pattern creation step.

6. The color adjustment method of claim 5, wherein each of the plural image forming apparatuses includes: an image carrier that carries a toner image; a light source for exposing the image carrier and forming an electrostatic latent image; and a developing unit that develops the formed electrostatic latent image by a developer, and in the imaging process setting step, the setting of the imaging process is changed by changing an output amount of the light source.

7. The color adjustment method of claim 5, wherein each of the plural image forming apparatuses includes: an image carrier that carries a toner image; a charger that charges the image carrier; a light source for exposing the charged image carrier and forming an electrostatic latent image; and a developing unit that develops the formed electrostatic latent image by a developer, and in the imaging process setting step, the setting of the imaging process is changed by changing a charging voltage for the image carrier in the charger.

8. The color adjustment method of claim 1, wherein, in the density detection step, light is irradiated onto the respective patches, and the density information is obtained based on an image density signal including respective RGB signal components obtained by receiving light reflected by the respective patches, and in addition, with regard to patches of secondary or more colors, a luminance signal as a component representing brightness is extracted from the image density signal, and the density information is obtained based on the extracted luminance signal.

9. The color adjustment method of claim 1, wherein the n pieces of the coloring materials are three-color toner materials of cyan, magenta and yellow.

10. An image forming system that performs color adjustment for each of plural image forming apparatuses, wherein the plural image forming apparatuses include a first image forming apparatus, and a second image forming apparatus other than the first image forming apparatus, and each of the plural image forming apparatuses includes: an image forming unit that mixes n (n is a positive integer) pieces of coloring materials with one another to form an image on a sheet, and in addition, forms, on the sheet, a gradation pattern image including patches of gradations different for each of colors ranging from a primary color composed of one color among the n pieces of the coloring materials to an n-ary color composed of n colors among the n pieces of the coloring materials; a density detection unit that detects densities of the respective patches included in the gradation pattern image formed on the sheet; and a density information obtaining unit that obtains density information from the densities of the respective patches, the densities being detected by the density detection unit, and the second image forming apparatus includes a color adjustment control unit that receives the density information of the respective patches in the first image forming apparatus, associates the density information obtained by the density information obtaining unit of the second image forming apparatus with the density information of the respective patches of the first image forming apparatus, creates a gamma curve corresponding to each of the respective colors ranging from the primary color to the n-ary color, the gamma curve serving for correcting a gradation of received image data, so as to obtain densities indicated by the density information of the respective patches in the first image forming apparatus, extracts respective color components ranging from the primary color to the n-ary color from the received image data, decides output values in each of the respective color components based on the gamma curve, creates output image data by synthesizing the decided output values of the primary color to the n-ary color with one another, and instructs the image forming unit to form the image on the sheet based on the created output image data.

11. The image forming system of claim 10, wherein the first image forming apparatus includes: a density capture unit that captures densities of a screen patch of plural gradations by the primary color; and a control unit that instructs the image forming unit to output the screen patch, obtains screen gradation characteristics from the respective densities of the screen patch of the plural gradations, the densities being captured by the density capture unit, and creates a screen gradation correction curve based on the screen gradation characteristics, and the image forming unit of each of the first image forming apparatus and the second image forming apparatus forms the gradation pattern image on the sheet by applying the screen gradation correction curve created by the control unit of the first image forming apparatus.

12. An image forming system that performs color adjustment for each of plural image forming apparatuses, the image forming system comprising:

plural image forming apparatuses, each of which including: an image forming unit that mixes n (n is a positive integer) pieces of coloring materials with one another to form an image on a sheet, and in addition, forms, on the sheet, a gradation pattern image including patches of gradations different for each of colors ranging from a primary color composed of one color among the n pieces of the coloring materials to an n-ary color composed of n colors among the n pieces of the coloring materials; a density detection unit that detects densities of the respective patches included in the gradation pattern image formed on the sheet; and a density information obtaining unit that obtains density information from the densities of the respective patches, the densities being detected by the density detection unit; and an average density information obtaining unit that calculates an average of the density information among the plural image forming apparatuses from the density information for each of the image forming apparatuses, the density information being obtained in each of the plural image forming apparatuses, and then obtains average density information, wherein each of the plural image forming apparatuses includes a color adjustment control unit that receives the average density information obtained by the average density information obtaining unit, associates the density information obtained by the density information obtaining unit with the average density information, creates a gamma curve corresponding to each of the respective colors ranging from the primary color to the n-ary color, the gamma curve serving for correcting a gradation of received image data, so as to obtain densities indicated by the average density information, extracts respective color components ranging from the primary color to the n-ary color from the received image data, decides output values in each of the respective color components based on the gamma curve, creates output image data by synthesizing the decided output values of the primary color to the n-ary color with one another, and instructs the image forming unit to form the image on the sheet based on the created output image data.

13. The image forming system of claim 12, wherein each of the plural image forming apparatuses includes: a density capture unit that captures densities of a screen patch of plural gradations by the primary color; and a control unit that instructs the image forming unit to output the screen patch, and obtains the respective densities of the screen patch of the plural gradations, the densities being captured by the density capture unit, the image forming system further includes: a screen gradation correction curve creation unit that obtains average screen gradation characteristics by calculating averages of the respective densities of the screen patches of the plural gradations among the plural image forming apparatuses from the respective densities of the screen patches of the plural gradations, the densities being obtained in each of the plural image forming apparatuses, and creates a screen gradation correction curve based on the obtained average screen gradation characteristics, and the image forming unit of each of the plural image forming apparatuses forms the gradation pattern image on the sheet by applying the screen gradation correction curve created by the screen gradation correction curve creation unit.

14. The image forming system of claim 10, wherein each of the plural image forming apparatuses includes a control unit that instructs the image forming unit to form, on the sheet, a maximum gradation patch having a maximum gradation in the primary color, obtains imaging process characteristics specified from a density of the maximum gradation patch, receives imaging process characteristics obtained in the other image forming apparatus, and changes setting of an imaging process in the image forming unit so that the density at the maximum gradation in the primary color indicated by the imaging process characteristics of the image forming apparatus is to be the density at the maximum gradation in the primary color indicated by the imaging process characteristics of the other image forming apparatus, wherein the control unit instructs the image forming unit to form the gradation pattern image on the sheet after changing the setting of the imaging process.

15. The image forming system of claim 14, wherein each of the image forming units of the plural image forming apparatuses includes: an image carrier that carries a toner image; a light source for exposing the image carrier and forming an electrostatic latent image; and a developing unit that develops the formed electrostatic latent image by a developer, and the control unit changes the setting of the imaging process by changing an output amount of the light source.

16. The image forming system of claim 14, wherein each of the image forming units of the plural image forming apparatuses includes: an image carrier that carries a toner image; a charger that charges the image carrier; a light source for exposing the charged image carrier and forming an electrostatic latent image; and a developing unit that develops the formed electrostatic latent image by a developer, and the control unit changes the setting of the imaging process by changing a charging voltage for the image carrier in the charger.

17. The image forming system of claim 10, wherein each of the density detection units of the plural image forming apparatuses irradiates light onto the respective patches, and obtains the densities of the respective patches by receiving light reflected by the respective patches, and in addition, outputs, to the density information obtaining unit, an image density signal including respective RGB signal components obtained by receiving the light reflected by the respective patches, and with regard to patches of secondary or more colors, each of the density information obtaining units of the plural image forming apparatuses extracts a luminance signal as a component representing brightness from the image density signal, and obtains the density information based on the extracted luminance signal.

18. The image forming system of claim 10, wherein the n pieces of the coloring materials are three-color toner materials of cyan, magenta and yellow.

* * * * *